US012689950B2

(12) United States Patent
Teyeb et al.

(10) Patent No.:  US 12,689,950 B2
(45) Date of Patent:    Jul. 21, 2026

(54) SIDELINK RELAY CELL RE-SELECTION AND MEASUREMENTS

(71) Applicant: InterDigital Patent Holdings, Inc., Wilmington, DE (US)

(72) Inventors: Oumer Teyeb, Montreal (CA); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 266 days.

(21) Appl. No.: 18/294,909

(22) PCT Filed: Aug. 2, 2022

(86) PCT No.: PCT/US2022/039159
§ 371 (c)(1),
(2) Date: Feb. 2, 2024

(87) PCT Pub. No.: WO2023/014709
PCT Pub. Date: Feb. 9, 2023

(65) Prior Publication Data
US 2024/0284272 A1      Aug. 22, 2024

Related U.S. Application Data

(60) Provisional application No. 63/228,851, filed on Aug. 3, 2021.

(51) Int. Cl.
*H04W 36/00*      (2009.01)
*H04W 36/08*      (2009.01)
*H04W 84/04*      (2009.01)
(52) U.S. Cl.
CPC ...  *H04W 36/0061* (2013.01); *H04W 36/0058* (2018.08); *H04W 36/008355* (2023.05);
(Continued)

(58) Field of Classification Search
CPC ......... H04W 36/0061; H04W 36/0058; H04W 36/008355; H04W 36/08;
(Continued)

(56) References Cited

U.S. PATENT DOCUMENTS

2011/0081903 A1    4/2011  Cai et al.
2013/0183971 A1    7/2013  Tamaki et al.
(Continued)

FOREIGN PATENT DOCUMENTS

JP        2009534899 A      9/2009
JP        2011082979 A      4/2011
(Continued)

OTHER PUBLICATIONS

3rd Generation Partnership Project (3GPP), RP-193253, "New SID: Study on NR Sidelink Relay", OPPO, 3GPP TSG RAN Meeting #86, Sitges, Spain, Dec. 9-12, 2019, pp. 1-5.
(Continued)

*Primary Examiner* — Schquita D Goodwin
(74) *Attorney, Agent, or Firm* — Condo Roccia Koptiw LLP

(57)        ABSTRACT

A relay wireless transmit/receive unit (WTRU) may be configured to receive information indicating characteristic (s) associated with a remote WTRU. The relay WTRU may receive configuration information associated with the relay WTRU. The relay WTRU may determine whether a remote WTRU is supported by the neighbor cell. The determination may be based on whether the characteristic(s) associated with the remote WTRU are supported by the neighbor cell. The relay WTRU may determine a behavior of relay WTRU based at least the configuration information and the percentage of remote WTRU(S) that is supported by the neighbor cell. The determined behavior may be associated with the neighbor cell. In examples, the determined behavior of the
(Continued)

Neighbor gNB1

Serving gNB

Remote WTRU    (Intermediate) Relay WTRU    Relay WTRU

Neighbor gNB2

Remote WTRU

— — — — Capability/Configuration information

............... Measurement, cell re-selection, handover behavior

Receive remote WTRU capabilities and configurations (e.g., from remote WTRUs, child relay WTRU, gNB)

(If an intermediate WTRU) propagate remote WTRU capabilities and configurations to parent relay Receive configuration of neighbor measurement and cell re-selection/handover behavior that is dependent on the capabilities/configurations of remote WTRUs and neighbor cells Apply configured behavior depending on the capabilities/configuration of directly/indirectly served remote WTRUs and neighbor cells (e.g., add a neighbor cell to a dynamic black list, start/stop performing cell re-selection/handover to a neighbor cell, prioritize/down-prioritize a neighbor cell for handover/cell re-selection, etc.)

relay WTRU may be based on the percentage of remote WTRU(s) that is supported by the neighbor cell being above or below a threshold.

16 Claims, 15 Drawing Sheets

(52) U.S. Cl.
CPC ...... *H04W 36/08* (2013.01); *H04W 36/00835* (2018.08); *H04W 36/033* (2023.05); *H04W 84/042* (2013.01)

(58) Field of Classification Search
CPC ......... H04W 36/00835; H04W 36/033; H04W 84/042; H04W 8/186; H04W 36/0009; H04W 48/02; H04W 84/005; H04W 88/04
See application file for complete search history.

(56) References Cited

U.S. PATENT DOCUMENTS

2019/0357099 A1      11/2019   Xu
2020/0084656 A1*     3/2020   Nguyen ................ H04W 92/18

2020/0221532 A1*    7/2020   Jung ..................... H04W 48/20
2022/0279393 A1*    9/2022   Di Girolamo .... H04W 36/0058
2022/0279542 A1*    9/2022   Elshafie ........... H04W 72/1263

FOREIGN PATENT DOCUMENTS

WO          2007119168  A2    10/2007
WO          2018/202797  A1    11/2018

OTHER PUBLICATIONS

3rd Generation Partnership Project (3GPP), TR 36.746 V15.1.1, "Technical Specification Group Radio Access Network, Study on further enhancements to LTE Device to Device (D2D), User Equipment (UE) to network relays for Internet of Things (IoT) and wearables, (Release 15)", Apr. 2018, pp. 1-55.

3rd Generation Partnership Project (3GPP), TS 36.300 V15.4.0, "Technical Specification Group Radio Access Network, Evolved Universal Terrestrial Radio Access (E-UTRA) and Evolved Universal Terrestrial Radio Access Network (E-UTRAN), Overall description, Stage 2 (Release 15)", Dec. 2022, pp. 1-365.

3rd Generation Partnership Project (3GPP), TS 38.300 V16.1.0, Technical Specification Group Radio Access Network, NR, NR and NG-RAN Overall Description, Stage 2 (Release 16), Mar. 2020, 133 pages.

* cited by examiner

User Plane Protocol Stack

Control Plane Protocol Stack

WTRU state machine and state transitions in NR

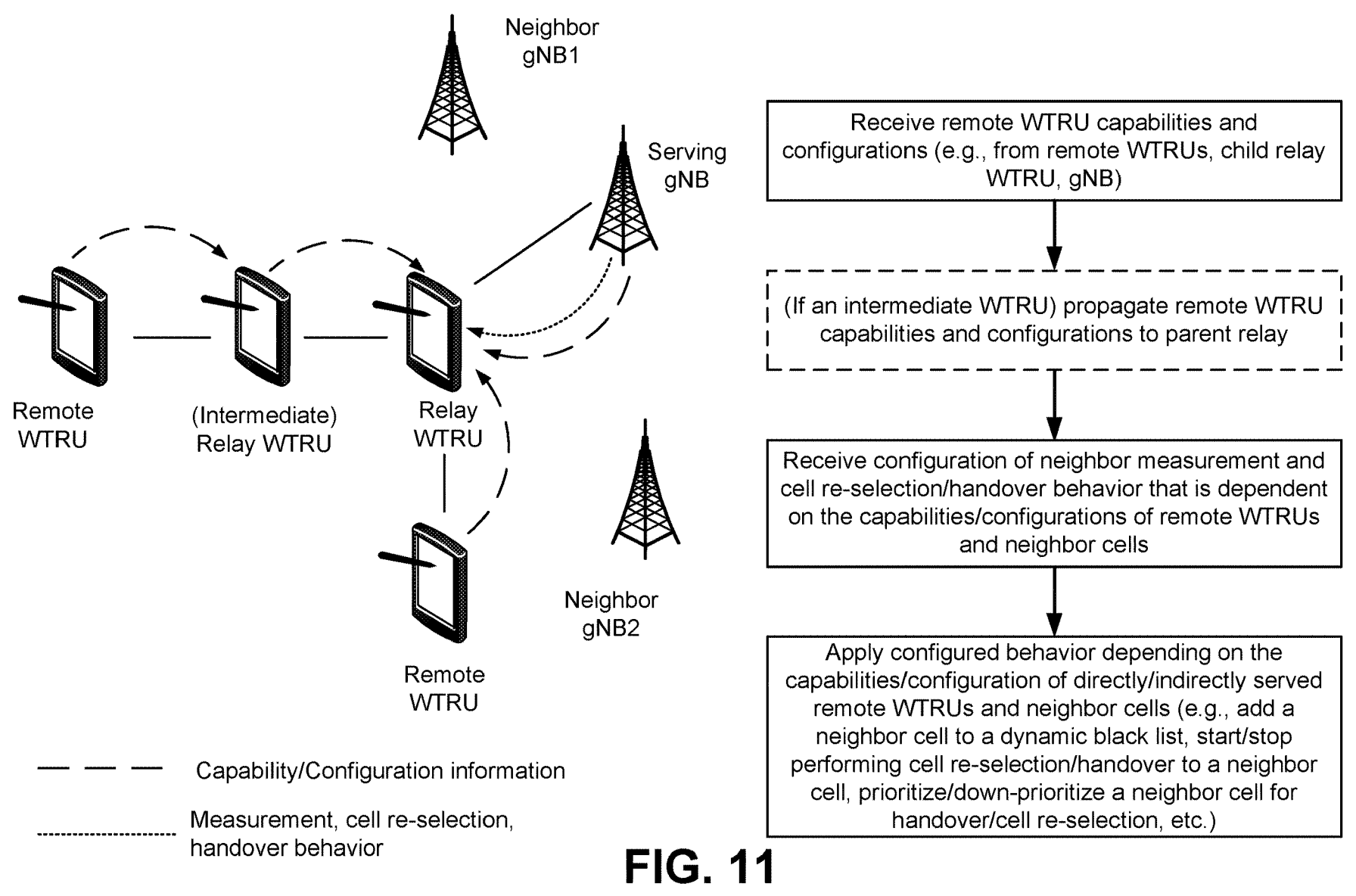

Receive remote WTRU capabilities and configurations (e.g., from remote WTRUs, child relay WTRU, gNB)

(If an intermediate WTRU) propagate remote WTRU capabilities and configurations to parent relay Receive configuration of neighbor measurement and cell re-selection/handover behavior that is dependent on the capabilities/configurations of remote WTRUs and neighbor cells Apply configured behavior depending on the capabilities/configuration of directly/indirectly served remote WTRUs and neighbor cells (e.g., add a neighbor cell to a dynamic black list, start/stop performing cell re-selection/handover to a neighbor cell, prioritize/down-prioritize a neighbor cell for handover/cell re-selection, etc.)

FIG. 11

Neighbor gNB1

Serving gNB

Neighbor gNB2

Relay WTRU

Remote WTRU (Intermediate) Relay WTRU

Remote WTRU

— — —  Capability/Configuration information

··········  Measurement, cell re-selection, handover behavior

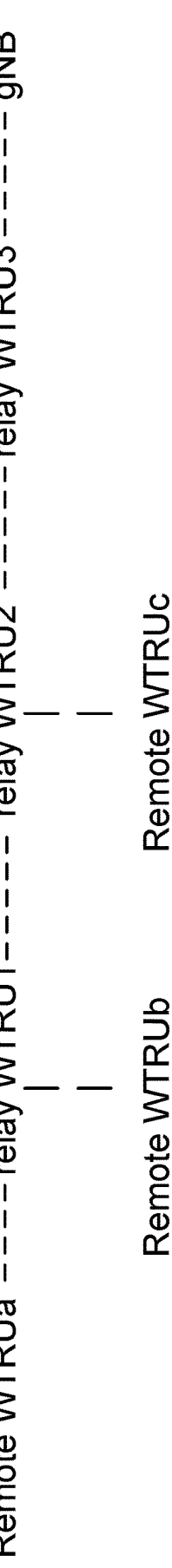
FIG. 12

SIDELINK RELAY CELL RE-SELECTION AND MEASUREMENTS

CROSS-REFERENCE TO RELATED APPLICATIONS

This application is the National Stage Entry under 35 U.S.C. § 371 of Patent Cooperation Treaty Application No. PCT/US2022/039159, filed Aug. 2, 2022, which claims the benefit of Provisional U.S. Patent Application No. 63/228, 851, filed Aug. 3, 2021, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for sidelink (SL) relay cell re-selection and measurements.

A relay wireless transmit/receive unit (WTRU) may receive information indicating characteristic(s) (e.g., respective characteristic(s)) associated with a remote WTRU (e.g., respective characteristic(s) of respective remote WTRU(s)). The characteristic(s) associated with the remote WTRU may include at least one of: a supported public land mobile network (PLMN); a configured radio access network (RAN) area; or a remote capability. The remote capability may include at least one of: a supported frequency; or a supported bandwidth.

The relay WTRU may receive configuration information associated with the relay WTRU. The relay WTRU may determine whether a remote WTRU (e.g., each of a number of WTRU(s)) is supported by the neighbor cell. The determination may be based on whether the (e.g., respective) characteristic(s) (e.g., a supported PLMN, a configured RAN area, and/or a remote capability) associated with the remote WTRU (e.g., each of a number of WTRUs) are supported by the neighbor cell. In examples, the relay WTRU may determine that a first remote WTRU is supported by the neighbor cell if a PLMN associated with the first remote WTRU is supported by the neighbor cell. In examples, the WTRU may determine that a second remote WTRU is supported by the neighbor cell if a second remote WTRU capability and a configured RAN area associated with the second WTRU are supported by the neighbor cell.

The relay WTRU may determine a behavior of relay WTRU based on at least the configuration information and the number/percentage of remote WTRU(s) that is supported by the neighbor cell. The determined behavior may be associated with the neighbor cell. The determined behavior may be associated with cell re-selection or handover. In examples (e.g., where the neighbor cell does not support remote WTRU(s) associated with the relay WTRU, a threshold number/percentage of remote WTRU(s) associated with the relay WTRU, etc.), the determined behavior may include at least one of: disabling cell re-selection to the neighbor cell; disabling measurements on the neighbor cell; disabling sending a measurement report that is triggered due to the neighbor cell; or de-prioritizing measurements for the neighbor cell. The relay WTRU may implement the determined behavior associated with the neighbor cell.

The determined behavior of the relay WTRU may be based on the percentage of remote WTRU(s) that is supported by the neighbor cell being above or below a threshold. In examples, first neighbor cell and a second a neighbor cell may be available. The relay WTRU may be connected to a first neighbor cell. If the percentage of remote WTRU(s) that is supported by the first neighbor cell is below the threshold, the determined behavior of the relay WTRU may be performing cell re-selection to the second neighbor cell. If the percentage of remote WTRU(s) that is supported by the first neighbor cell is above the threshold, the determined behavior of the relay WTRU may be performing a measurement of the first neighbor cell. In examples, the received configuration information may include a first behavior and a second behavior. The determined behavior of the relay WTRU may be the first behavior or the second behavior. If the percentage of remote WTRU(s) that is supported by the neighbor cell is above the threshold, the determined behavior of the relay WTRU may be the first behavior. If the percentage of remote WTRU(s) that is supported by the first neighbor cell is below the threshold, the determined behavior of the relay WTRU may be the second behavior.

BRIEF DESCRIPTION OF THE DRAWINGS

FIG. 8 illustrates an example of a control plane protocol stack for L2 WTRU-to-Network Relay.

FIG. 11 illustrates an example of a relay WTRU determining a behavior associated with a neighbor cell.

FIG. 12 illustrates an example of served WTRUs and relay WTRUs being served by the relay WTRU.

DETAILED DESCRIPTION

Figure 1A:
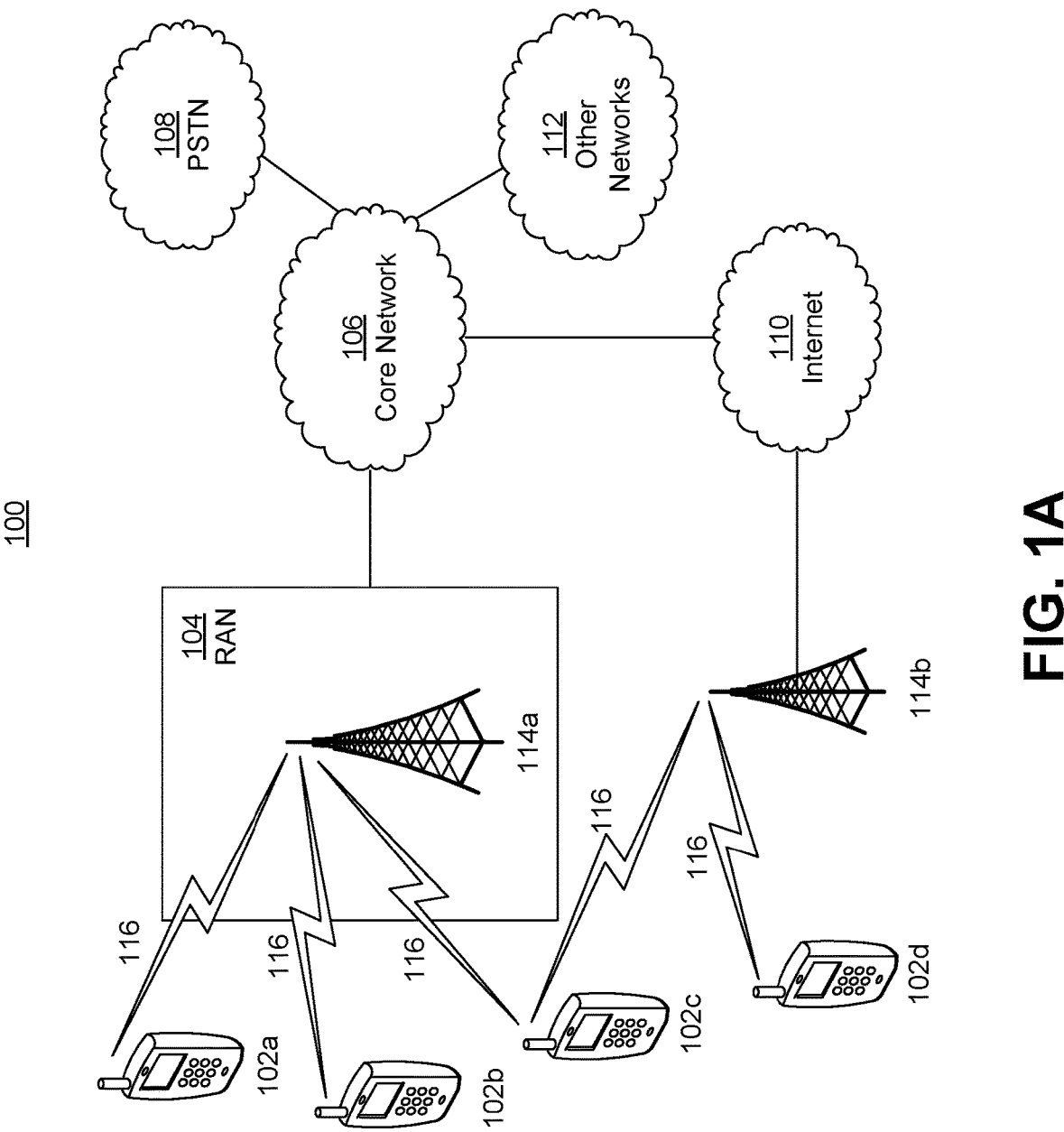
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
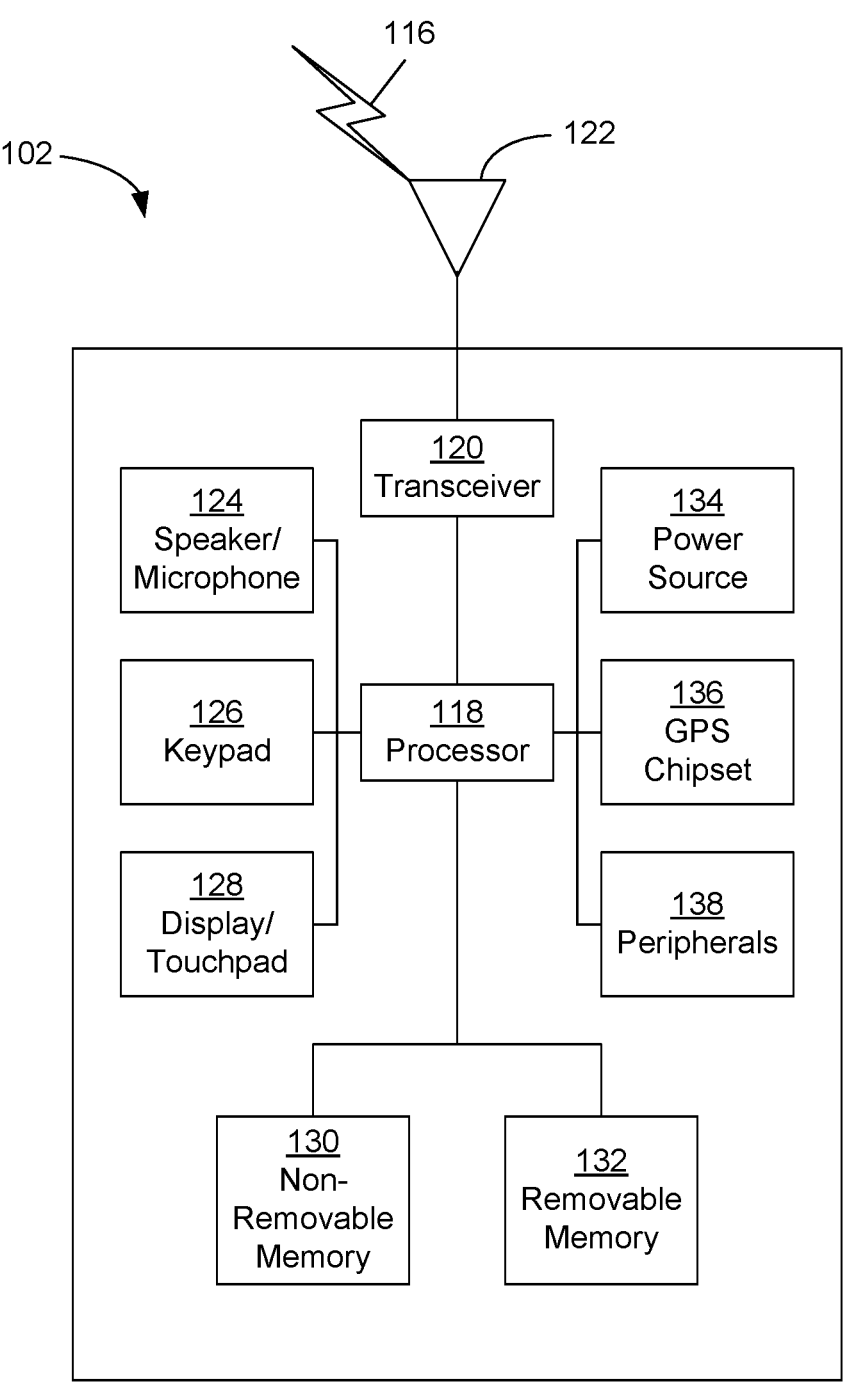
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the uplink (UL) (e.g., for transmission) or the downlink (e.g., for reception)).

Figure 1C:
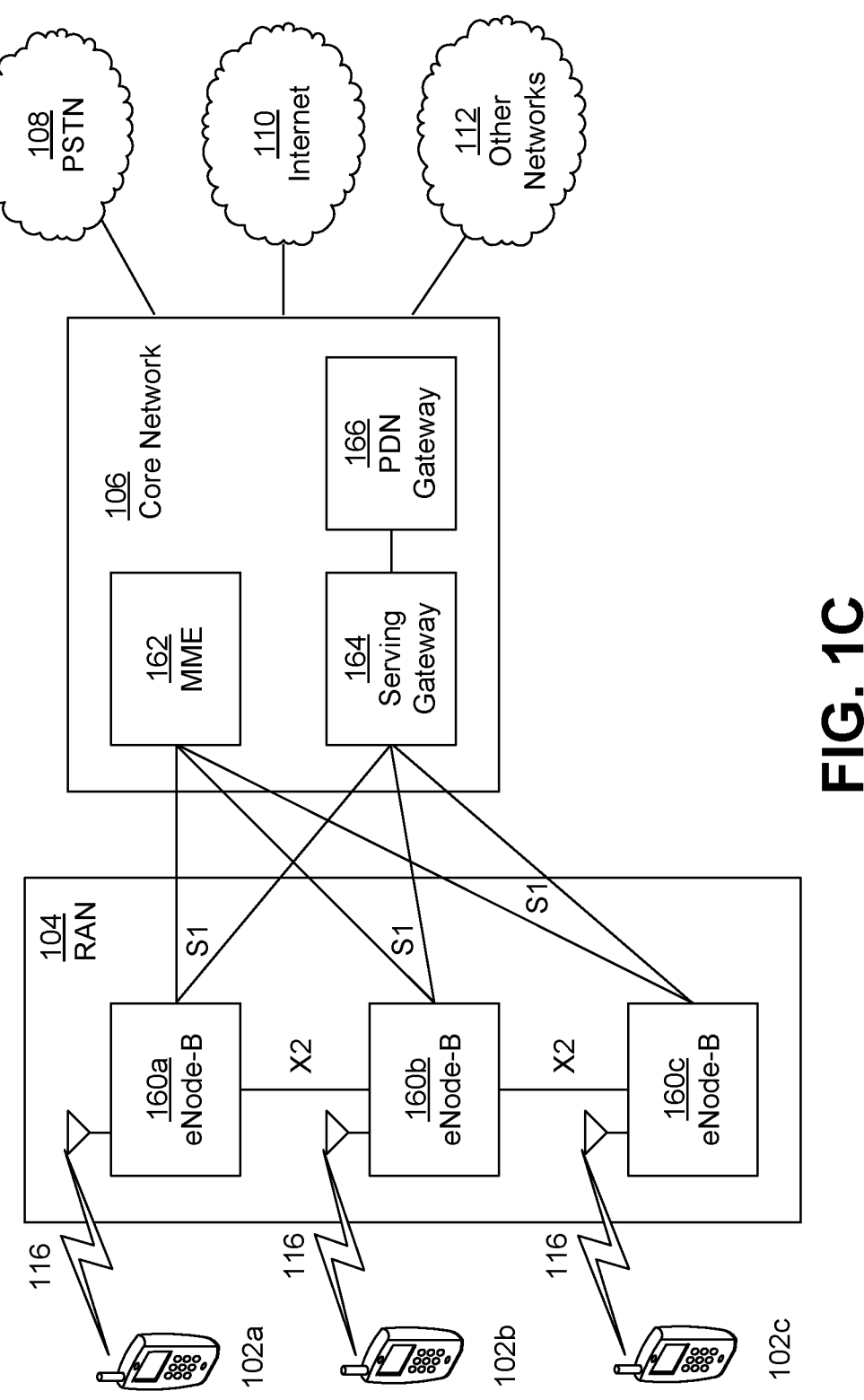
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
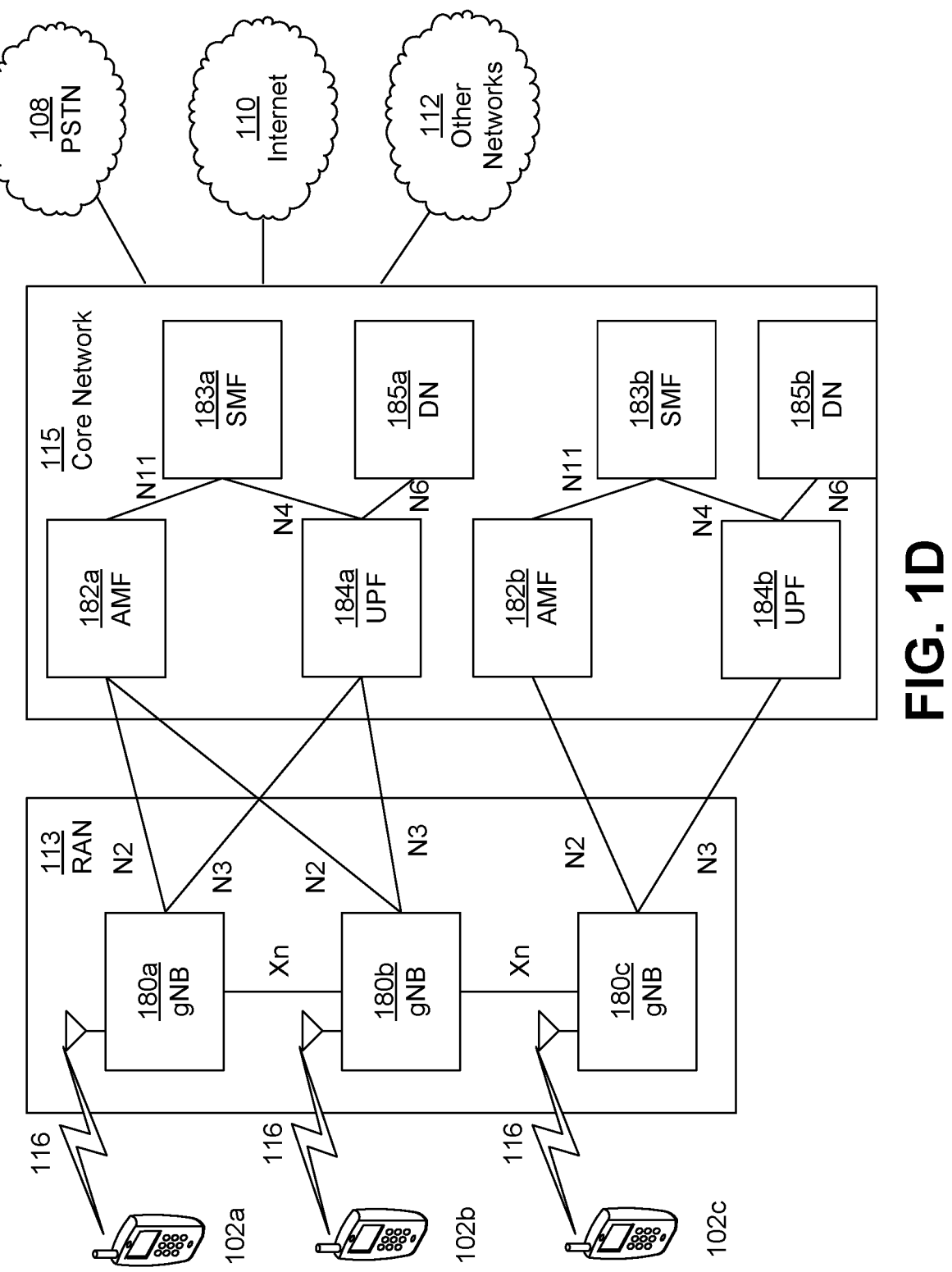
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for sidelink (SL) relay cell re-selection and measurements.

A relay wireless transmit/receive unit (WTRU) may receive information indicating characteristic(s) (e.g., respective characteristic(s)) associated with a remote WTRU (e.g., respective characteristic(s) of respective remote WTRU(s). The characteristic(s) associated with the remote WTRU may include at least one of: a supported public land mobile network (PLMN); a configured radio access network (RAN) area; or a remote capability. The remote capability may include at least one of: a supported frequency; or a supported bandwidth.

The relay WTRU may receive configuration information associated with the relay WTRU. The relay WTRU may determine whether a remote WTRU (e.g., each of a number of WTRU(s) is supported by the neighbor cell. The determination may be based on whether the (e.g., respective) characteristic(s) (e.g., a supported PLMN, a configured RAN area, and/or a remote capability) associated with the remote WTRU (e.g., each of a number of WTRUs) are supported by the neighbor cell. In examples, the relay WTRU may determine that a first remote WTRU is supported by the neighbor cell if a PLMN associated with the first remote WTRU is supported by the neighbor cell. In examples, the WTRU may determine that a second remote WTRU is supported by the neighbor cell if a second remote WTRU capability and a configured RAN area associated with the second WTRU are supported by the neighbor cell.

The relay WTRU may determine a behavior of relay WTRU based on at least the configuration information and the percentage of remote WTRU(s) that is supported by the neighbor cell. The determined behavior may be associated with the neighbor cell. The determined behavior may be associated with cell re-selection or handover. In examples (e.g., where the neighbor cell does not support remote WTRU(s) associated with the relay WTRU, a threshold number/percentage of remote WTRU(s) associated with the relay WTRU, etc.), the determined behavior may include at least one of: disabling cell re-selection to the neighbor cell; disabling measurements on the neighbor cell; disabling sending a measurement report that is triggered due to the neighbor cell; or de-prioritizing measurements for the neighbor cell. The relay WTRU may implement the determined behavior associated with the neighbor cell.

The determined behavior of the relay WTRU may be based on the percentage of remote WTRU(s) that is supported by the neighbor cell being above or below a threshold. In examples, first neighbor cell and a second neighbor cell may be available. The relay WTRU may be connected to a first neighbor cell. If the percentage of remote WTRU(s) that is supported by the first neighbor cell is below the threshold, the determined behavior of the relay WTRU may be performing cell re-selection to the second neighbor cell. If the percentage of remote WTRU(s) that is supported by the first neighbor cell is above the threshold, the determined behavior of the relay WTRU may be performing a measurement of the first neighbor cell. In examples, the received configuration information may include a first behavior and a second behavior. The determined behavior of the relay WTRU may be the first behavior or the second behavior. If the percentage of remote WTRU(s) that is supported by the neighbor cell is above the threshold, the determined behavior of the relay WTRU may be the first behavior. If the percentage of remote WTRU(s) that is supported by the first neighbor cell is below the threshold, the determined behavior of the relay WTRU may be the second behavior.

A relay WTRU may be configured to receive information regarding PLMN support, RAN area configuration, and WTRU capabilities of served WTRU(s) (e.g., remote WTRU(s) or child relay WTRU(s). WTRUs may be configured to send information regarding PLMN support, RAN area configuration, and WTRU capabilities to their serving relay WTRU. The relay WTRU may be configured to consider the PLMN support, the RAN area configuration, the WTRU capabilities, or a combination of these features for performing at least one of: cell-reselection, measurements, or measurement reporting. The relay WTRU may be configured to not perform measurements for cell re-selection or handover on a given neighbor cell if the concerned cell does not support a certain configured percentage of the directly or indirectly served/remote WTRU(s). In examples, a cell may be considered to be supported by a given WTRU if the cell has a PLMN supported by the served/remote WTRU, the cell is within the configured RAN area of the served/remote WTRU, or the cell matches the served/remote WTRU capabilities. The relay WTRU may be configured to modify the measurements for cell re-selection or handover (e.g., scale the neighbor's signal level during comparison with absolute thresholds, apply a certain offset when comparing with the serving cell, etc.) depending on a configurable threshold that is associated with the level or percentage of supported served/remote WTRUs by the neighbor cell. The relay WTRU may be configured to not send measurement reports triggered due to a fulfillment of a measurement reporting condition associated with a given neighbor cell. The fulfillment of the measurement reporting condition may depend on a configurable threshold that is associated with the level or percentage of supported served WTRU(s) (e.g., remote WTRU(s)) by the neighbor cell. The relay WTRU may be configured to send a RAN area (e.g., group RAN area) update information regarding served WTRU(s) (e.g., remote WTRU(s)). The relay WTRU may be configured to delay individual RAN area update messages from a served WTRU (e.g., remote WTRU) according to a specified configuration (e.g., until a certain number of individual RAN area updates are received or detected by the relay WTRU, until a certain time has elapsed since the last group RAN update, until the relay WTRU's own next periodic RAN area update, etc.).

A relay WTRU may receive info about PLMN, RAN area, or WTRU capabilities of the (e.g., directly) served/remote WTRUs and forward the info to a parent relay WTRU. The relay WTRU may apply modified measurements and cell-reselection behavior that considers the served WTRUs capabilities/support/configuration and the properties/configuration of a neighbor cell.

A SL relay WTRU may be configured to decide if it performs measurements on a neighbor cell for cell re-selection or handover. A SL relay WTRU may be configured to modify the way the measurements or measurement reporting are performed (e.g., prioritize/de-prioritize certain cells, scaling up/down neighbor cell measurements during comparison with absolute thresholds or relative thresholds as compared with serving cell). The decision to perform measurements may be based on the considerations of the capabilities (e.g., supported frequencies, bandwidth, etc.) and configurations (e.g., supported PLMN, RAN area configuration, etc.) of served WTRUs (e.g., remote WTRUs and relay WTRUs that may be directly or indirectly being served by the relay WTRU) and the configuration or properties of the neighbor cell.

A relay WTRU may receive information about one or more of the following about served WTRUs (e.g., from a remote WTRU, from the gNB, from a child relay WTRU serving a remote WTRU, etc.): supported PLMNs; RAN area related information (e.g., for an INACTIVE served WTRU or child relay WTRU); or WTRU capabilities. The relay WTRU may be configured to forward information (e.g., the above-mentioned information) about served WTRUs to a parent relay WTRU. The relay WTRU may receive a configuration (e.g., from the gNB) on the behavior regarding cell re-selection, measurements, and measurement reporting. The configuration on the behavior may be dependent on the support of the neighbor cell by the served WTRUs. The served WTRUs may be assumed to support a neighbor cell if one or more of the following are fulfilled: the neighbor cell supports the PLMN(s) supported by the WTRU; the neighbor cell is within the configured RAN area of the WTRU; or the WTRU is capable of operating within the neighbor cell (e.g., supported frequency, bandwidth, etc.). The configuration on the behavior regarding cell re-selection, measurements, and measurement reports may include: disabling measurements on a neighbor cell for cell re-selection, disabling cell re-selection to a neighbor cell, disabling performing measurements on a neighbor cell for Radio Resource Management (RRM), or disabling the sending a measurement report that may be triggered due to a fulfillment of a measurement reporting condition associated with a neighbor cell (e.g., if less than a specified percentage of the served WTRUs support the concerned neighbor cell); or de-prioritizing measurements for cell re-selection or RRM on a neighbor cell, which may include: scaling up or down thresholds or offsets on the measured signal levels or qualities of the neighbor cell based on the percentage of served WTRUs that do or do not support the concerned cell; or considering a neighbor cell that has more support from served WTRUs to be a preferred cell for cell-reselection or handover as compared to another cell that has a better radio conditions than the first cell, as long as the former is not worse than the latter by a specified threshold.

A relay WTRU may perform cell re-selection or receive a command from the gNB to perform a handover (HO) to a cell that a served WTRU (e.g., remote WTRU) does not support. A SL relay WTRU may be configured to inform a served WTRU about cell re-selection or handover to a cell that is not supported by the given served WTRU (e.g., a remote WTRU). A relay WTRU may receive information about one or more of the following about served WTRUs (e.g., from a remote WTRU, from the gNB, from a child relay WTRU serving a remote WTRU, etc.): supported PLMNs; RAN area related information (for an INACTIVE served WTRU or child relay WTRU); or WTRU capabilities. The relay WTRU may perform a handover or cell re-selection to a target cell. The relay WTRU, on determining that a served WTRU does not support the target cell (e.g., the target cell has a PLMN that the WTRU does not support), may send an indication to the served WTRU (e.g., the remote WTRU) to inform the served WTRU about the change.

A relay WTRU may perform a RAN area update on behalf of a multitude of served WTRUs (e.g., remote WTRUs). A SL relay WTRU may be configured to inform the network about the RAN area change of one or more served WTRUs. A relay WTRU may receive RAN area related information (e.g., list of cells in the RAN area, periodic RAN area update timers, etc.) for a served WTRU (e.g., from a remote WTRU, from the gNB, from a child relay WTRU serving a remote WTRU, etc.). The relay WTRU may determine a served WTRU has to perform a RAN area update, which may be based on one or more of the following: receiving an indication from the served WTRU; determining at the relay WTRU based on the configured timer value for the served WTRU's periodic RAN area update; or determining at the relay WTRU, on performing a handover or cell re-selection, that the target cell is outside the configured RAN area of the served WTRU.

The relay WTRU may send to the network a group RAN area update that includes a RAN area update indication concerning one or multiple served WTRUs (e.g., remote WTRUs), which may include delaying the sending of the group RAN area update depending on configured factors (e.g., the number of served WTRUs whose RAN area has to be updated, the time elapsed since the last group RAN update, the time until the relay WTRU's own next periodic RAN area update, the time until the served WTRU with the most frequent RAN area update timer expires, the time until the served WTRU with the least frequent RAN area update timer expires, etc.). The relay WTRU may receive from the network a response message regarding the RAN area update message. The relay WTRU may forward the response message to the concerned WTRUs.

Figure 2:
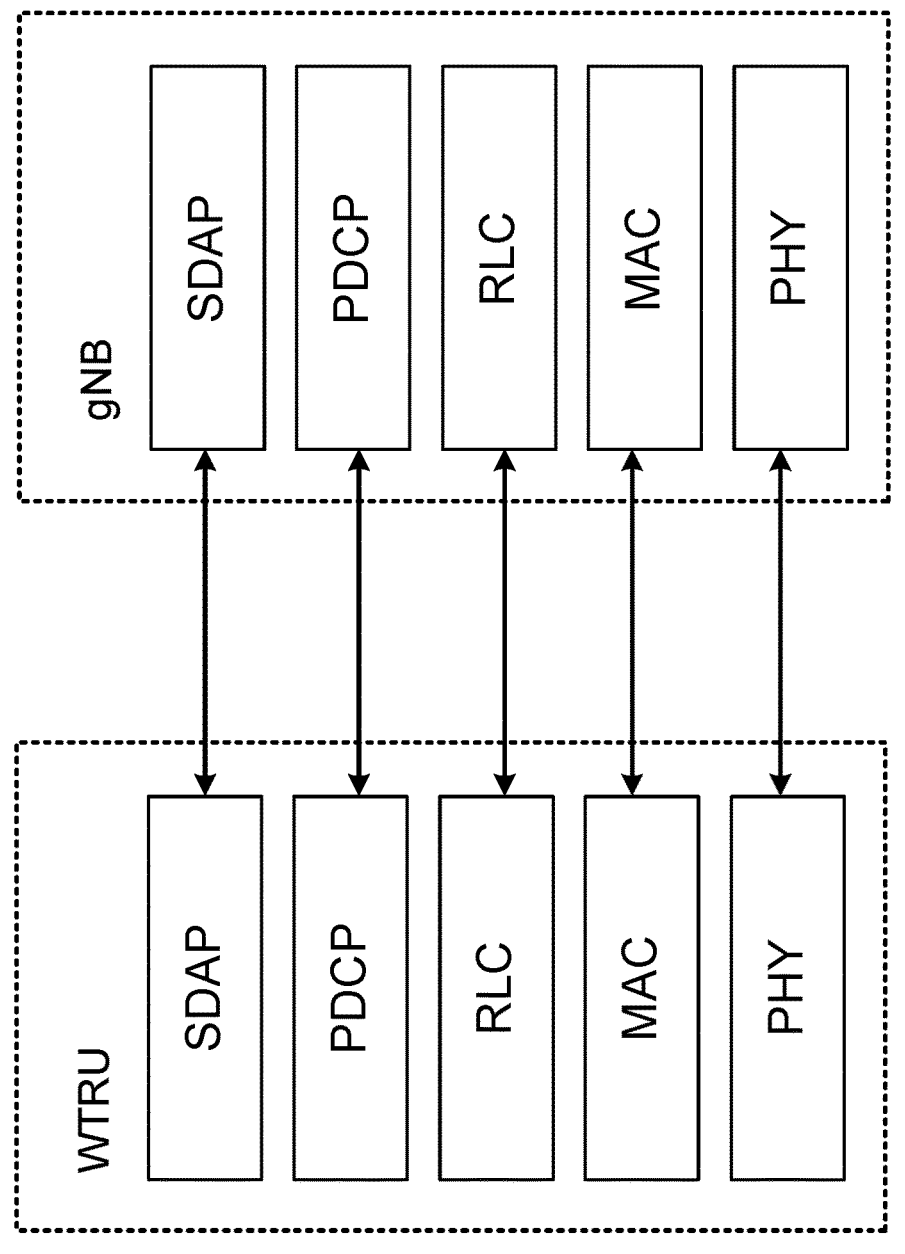
FIG. 2 illustrates an example of a user plane (UP) protocol stack for New Radio (NR) from the WTRU and gNB point of view.
Figure 3:
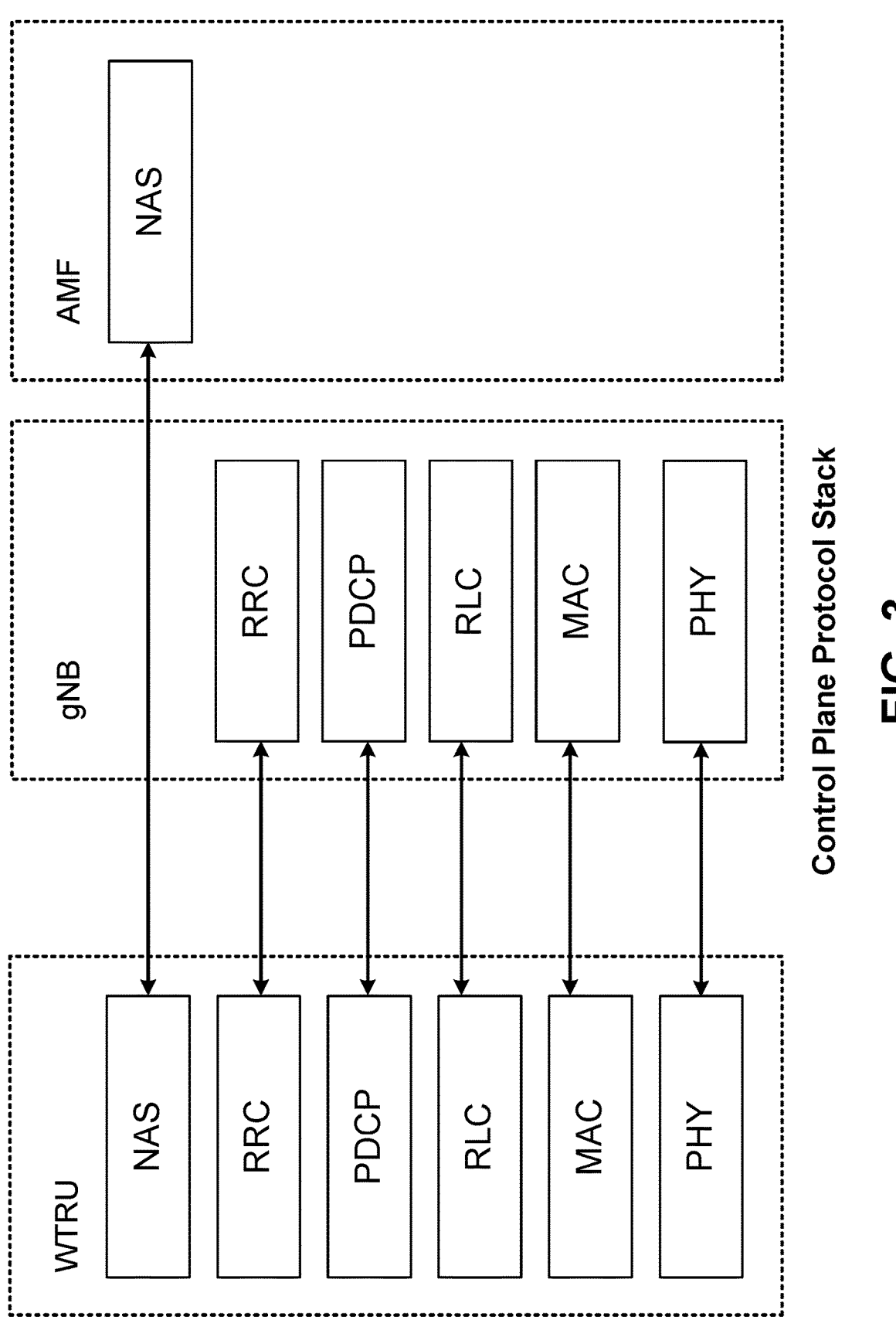
FIG. 3 illustrates an example of control plane protocol stack for NR from the WTRU and gNB point of view.

Examples of Radio Resource Protocol (RRC) and its states are provided herein. FIG. 2 illustrates an example of a user plane (UP) protocol stack for New Radio (NR) from the WTRU and gNB point of view. FIG. 3 illustrates an example of control plane protocol stack for NR from the WTRU and gNB point of view. The RRC protocol may be the protocol (e.g., main protocol) responsible for controlling a WTRU's connection to the network. The RRC protocol may include one or more of the following functions (e.g., main functions): broadcast of system information (e.g., for enabling access to the cell by WTRUs); paging for indicating to the WTRU the arrival of downlink (DL) data; establishment, maintenance, and release of a radio connection (e.g., that may include carrier aggregation (CA) and dual connectivity (DC)); security functions including security key management establishment, configuration, maintenance, and release of Signaling Radio Bearers (SRBs) and Data Radio Bearers (DRBs); mobility functions such as handover, context transfer, cell selection, and re-selection; WTRU measurements and control of the reporting; or detection of and recovery from radio link failure. A WTRU that is powered on may be in one of the following RRC states: IDLE, INACTIVE or CONNECTED.

For the RRC IDLE state, if a WTRU is first powered up, the WTRU's RRC may be in the RRC IDLE state. In the RRC IDLE state, the WTRU may be prepared to receive paging (e.g., for incoming voice calls, DL data reception, etc.). In the RRC IDLE state, the WTRU may not be registered to a particular cell, hence the WTRU may not have an Access Stratum (AS) context and any other information received from the network. In the RRC IDLE state, the WTRU may perform mobility procedures (e.g., which may include cell selection and cell re-selection).

Cell selection may be a procedure where the WTRU may select a cell to camp on (e.g., camp on initially) if powering up or transitioning from the RRC CONNECTED state to the RRC IDLE state. The WTRU may be configured with a list of PLMN identifiers that the WTRU is registered with or capable of accessing (e.g., the list of operators and their services). There may be a prioritization among the PLMNs (e.g., PLMN1 having a higher priority than PLMN2, etc.) or the preferred PLMN may be manually selected by the user (e.g., via a user interface of the WTRU). The WTRU may be configured with a list of frequencies and Radio Access Technologies (RATs) that the WTRU supports. The frequencies and RATs may include a prioritization (e.g., 5G first priority, 4G second priority, etc.). The preferred RAT may be chosen by the user.

The WTRU may search the NR frequency bands. For each carrier frequency that the WTRU detects, the WTRU may identify the strongest cell. The WTRU may read a cell system information broadcast to identify its PLMN. The WTRU may seek to identify a suitable cell. If the WTRU is not able to identify a suitable cell, it may seek to identify an acceptable cell. A suitable cell may be: one for which the measured cell attributes satisfy the cell selection criteria; the cell PLMN is the selected PLMN, registered, or an equivalent PLMN; the cell is not barred or reserved; and the cell is not part of a tracking area which is in the list of "forbidden tracking areas for roaming." An acceptable cell may be one for which the measured cell attributes satisfy the cell selection criteria and the cell is not barred. If a cell's signal levels and/or quality are better than certain configured thresholds, the cell may be considered to satisfy the cell selection criteria. If a suitable cell is found or if (e.g., if only) an acceptable cell is found, the WTRU may camp on that cell (e.g., which may be known as the serving cell) and commence the cell reselection procedure.

Cell re-selection may be a procedure where a WTRU in the RRC IDLE state may change the cell the WTRU is camping on if the WTRU detects a neighbor cell that has better radio conditions (e.g., according to some specific comparison thresholds that the WTRU may be configured with, for example, via the broadcast information of the current serving cell). The WTRU may (e.g., may also) be configured to not perform measurements on neighbor cells for cell re-selection as long as the current serving cell's radio signal level/quality are not below a certain threshold.

The WTRU in the RRC IDLE state may monitor paging messages from the network to receive incoming voice calls or incoming data. The WTRU may be configured with a WTRU identity (e.g., a paging WTRU identity). The WTRU may check if the paging messages the network is broadcasting indicate the WTRU identity. Since continuously monitoring and decoding the paging channel may be power consuming, the WTRU may be configured for Discontinuous Reception (DRX). The WTRU may wake up periodically (e.g., only periodically), according to a configured DRX cycle, to monitor for paging messages that are directed to the WTRU. If the WTRU detects a paging message directed to the WTRU, the WTRU may start the connection establishment procedure to transition to the RRC CONNECTED state.

Figure 4:
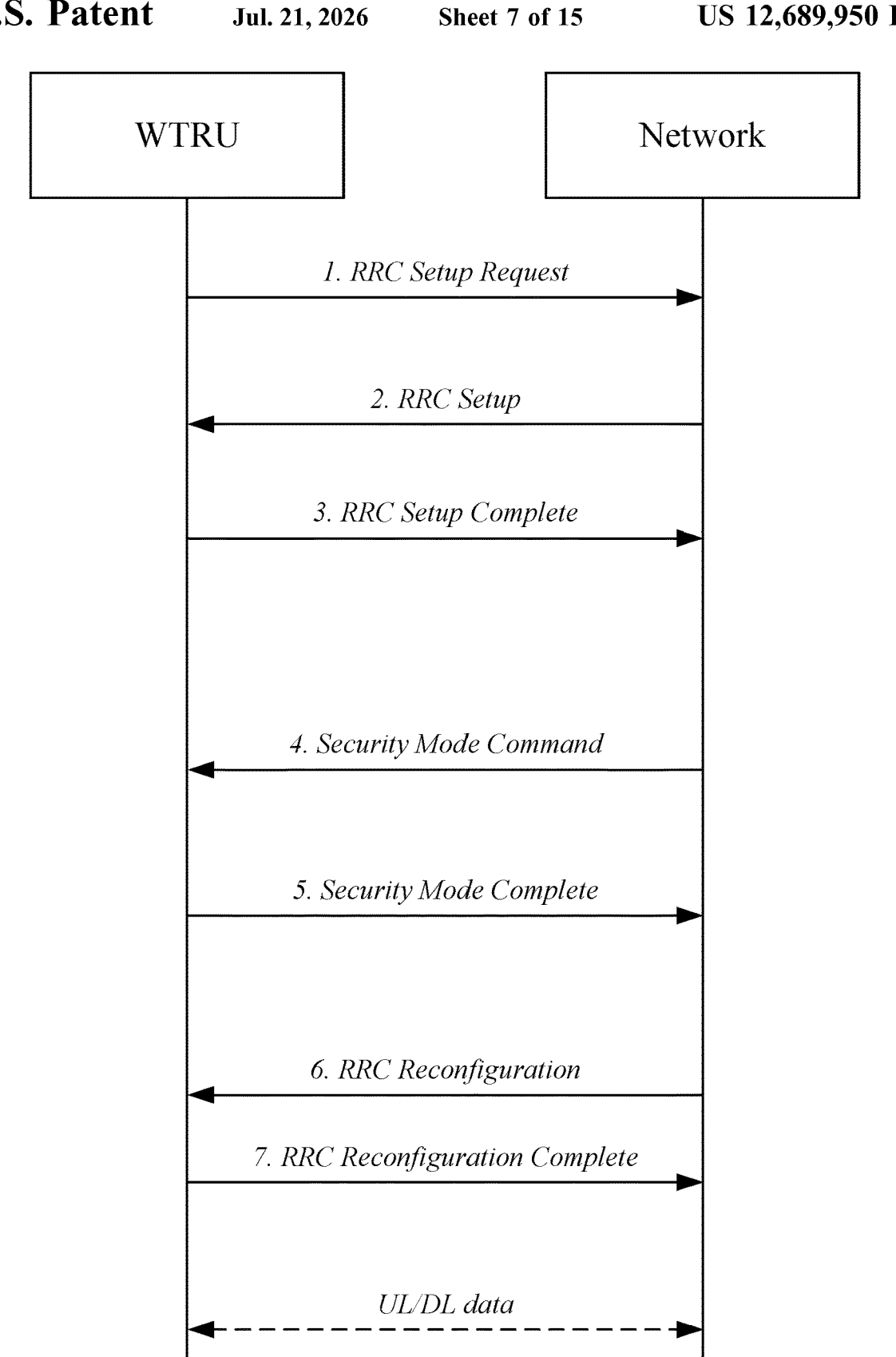
FIG. 4 illustrates an example of a connection setup procedure for a Radio Resource Control (RRC) CONNECTED state.

FIG. 4 illustrates an example of a connection setup procedure for a RRC CONNECTED state. For the RRC CONNECTED state, if the WTRU is paged (e.g., incoming voice call, incoming downlink data, etc.) or the WTRU wants to initiate an uplink (UL) transmission (e.g., outgoing voice call, access to a data service initiated by the WTRU, etc.), a RRC IDLE WTRU may initiate a connection setup procedure. The connection setup procedure may be performed as described herein.

The Signaling Radio Bearer 1 (SRB1) that may be used for signaling (e.g., control plane) may be configured to communicate with the network. The WTRU may send a RRC connection setup request message (RRCSetupRequest) towards the current serving cell where the WTRU is camping on. The RRCSetupRequest message may include an indication of the WTRU identity (e.g., an initial WTRU identity) and the reason (e.g., cause) of establishment (e.g., mobile originated voice call, mobile originated data call, mobile terminated access due to paging, emergency, etc.). The network may respond with a RRC Connection Setup (RRCSetup) message. The RRCSetup message may include configuration information for setting up a SRB1 (e.g., a SRB1 PDCP (bearer) configuration, a RLC, and a MAC level configuration for the SRB1). The WTRU may respond by sending a RRCSetupComplete message.

The connection setup procedure may include setting up security. The WTRU may receive a SecurityModeCommand message from the network. The SecurityModeCommand message may indicate to the WTRU the encryption and integrity protection algorithms to be used for communication (e.g., from there onwards). Encryption may ensure that the WTRU (e.g., only the WTRU) with the correct encryption key will be able to decode the message properly. Integrity protection may ensure that no intermediary entity has manipulated the message (e.g., the message is the same as when it left the sender).

The WTRU may derive the key associated with the base station (known as the KgNB key). The KgNB key may be updated if (e.g., every time) the WTRU performs connected mode mobility to another cell/gNB. The KgNB key derivation may use information (e.g., additional information) such as the frequency of the target cell or the Physical Cell Identity (PCI) of the target cell. The WTRU may derive the integrity key for RRC (KRRCint) using the KgNB and the integrity protection algorithm indicated in the received SecurityModeCommand message. The WTRU may check the integrity of the received SecurityModeCommand message. If the integrity is verified, the WTRU may proceed to derive the encryption key for control plane and user plane messages (KRRCenc and KUPenc, respectively) and the integrity key for user plane message (KUPint) (e.g., which may be optionally configured). The WTRU may send a SecurityModeCommandComplete message to indicate to the network that the security setup has succeeded. Control plane (e.g., RRC) messages (e.g., all control plane messages) may be encrypted and integrity protected using the corresponding keys. The user plane message may be encrypted and if configured, integrity protected (e.g., integrity protected), both in the UL and DL directions. A security update procedure may be triggered by the network (e.g., anytime) via subsequent reconfigurations (e.g., due to handover).

The connection setup procedure may include setting up radio barriers. The network may send details of the radio bearers to be configured for enabling the desired data services to the WTRU. UL and DL data may be transmitted or received by the WTRU in a secure manner (e.g., accordingly). The network may send (e.g., send at anytime) a RRCReconfiguration message to release, modify, or add radio bearers, or handover the WTRU to another cell/gNB. In the RRC CONNECTED state, the WTRU may be provided with a connected mode WTRU identity known as the Cell Radio Network Temporary Identifier (C-RNTI). The WTRU may monitor (e.g., constantly monitor) the PDCCH to see if the PDCCH has a DL data or if the PDCCH is getting a grant for a pending UL transmission (e.g., the PDCCH indicates the DL data as well as the UL grant is for a given WTRU by associating the data sent in the PDCCH using the C-RNTI of the concerned WTRU).

The WTRU may transition from the RRC CONNECTED state to the RRC IDLE state. If there is no activity to or from the WTRU for a certain amount of time, the network may order the WTRU to move to the RRC IDLE state by sending the WTRU a RRCRelease command, which may reduce the WTRU's power consumption. The network may send the WTRU to the RRC IDLE state anytime, even if the WTRU is actively transmitting or receiving data.

If the WTRU loses a radio connection (e.g., going out of coverage for a certain duration, integrity verification failure of a control plane message, etc.), the WTRU may transition from the RRC CONNECTED to RRC IDLE state. If the WTRU losses the connection, which may be referred to as Radio Link Failure (RLF) or Handover Failure (HoF), HoF may occur if the connection is lost while performing a handover to another cell/gNB and the WTRU tries to perform re-establishment. If re-establishment fails, the WTRU may remain in the RRC IDLE state until the network pages it or a higher layer (e.g., an application on the WTRU) initiates an UL data transmission (e.g., initiate a voice call, initiate a request for a data service, etc.).

The WTRU may be in a RRC INACTIVE state. As mentioned herein, putting the WTRU in the RRC IDLE state may save the WTRU battery if the WTRU has not been active (e.g., no data sent or received) for a given time, as the WTRU does not have to continuously monitor the PDCCH. If the WTRU's data is intermittent (e.g., a smart phone sending small amounts of data very frequently), the sending of the WTRU back and forth between RRC CONNECTED and RRC IDLE state may cause control plane signaling (e.g., a lot of control plane signaling) in the network. The signaling to bring the WTRU from the RRC IDLE to RRC CONNECTED state may involve the RAN (e.g., gNB) and (e.g., and also) the Core Network (CN), since the network may not have WTRU context (e.g., any WTRU context) for a RRC IDLE WTRU and may not know where (e.g., know exactly where) the WTRU is. In examples, if the transition to the RRC CONNECTED state is triggered by DL data or an incoming voice call, the WTRU may have to be paged over the geographical area (e.g., all over the geographical area, for example, all gNBs/cells) the WTRU is registered at.

RRC IDLE to RRC CONNECTED transitions (e.g., frequent RRC IDLE to RRC CONNECTED transitions) may cause signaling overhead. The WTRU may have bearers that send data infrequently but are latency sensitive. It may not be desirable (e.g., accordingly) to put the WTRU in the RRC IDLE state even though the WTRU is not actively sending or receiving data frequently. The WTRU may be in an intermediate state known as the RRC INACTIVE state. In the RRC INACTIVE state, the WTRU may have the power saving advantages of the RRC IDLE state (e.g., not monitor the PDCCH continuously), but may be returned (e.g., quickly returned) to the RRC CONNECTED state. The return to the RRC CONNECTED state may be accomplished by releasing the WTRU connection but keeping the WTRU's context at the RAN and the WTRU, without involving the CN (e.g., the CN may see the WTRU in the same way as the WTRU in the RRC CONNECTED state).

Figure 5:
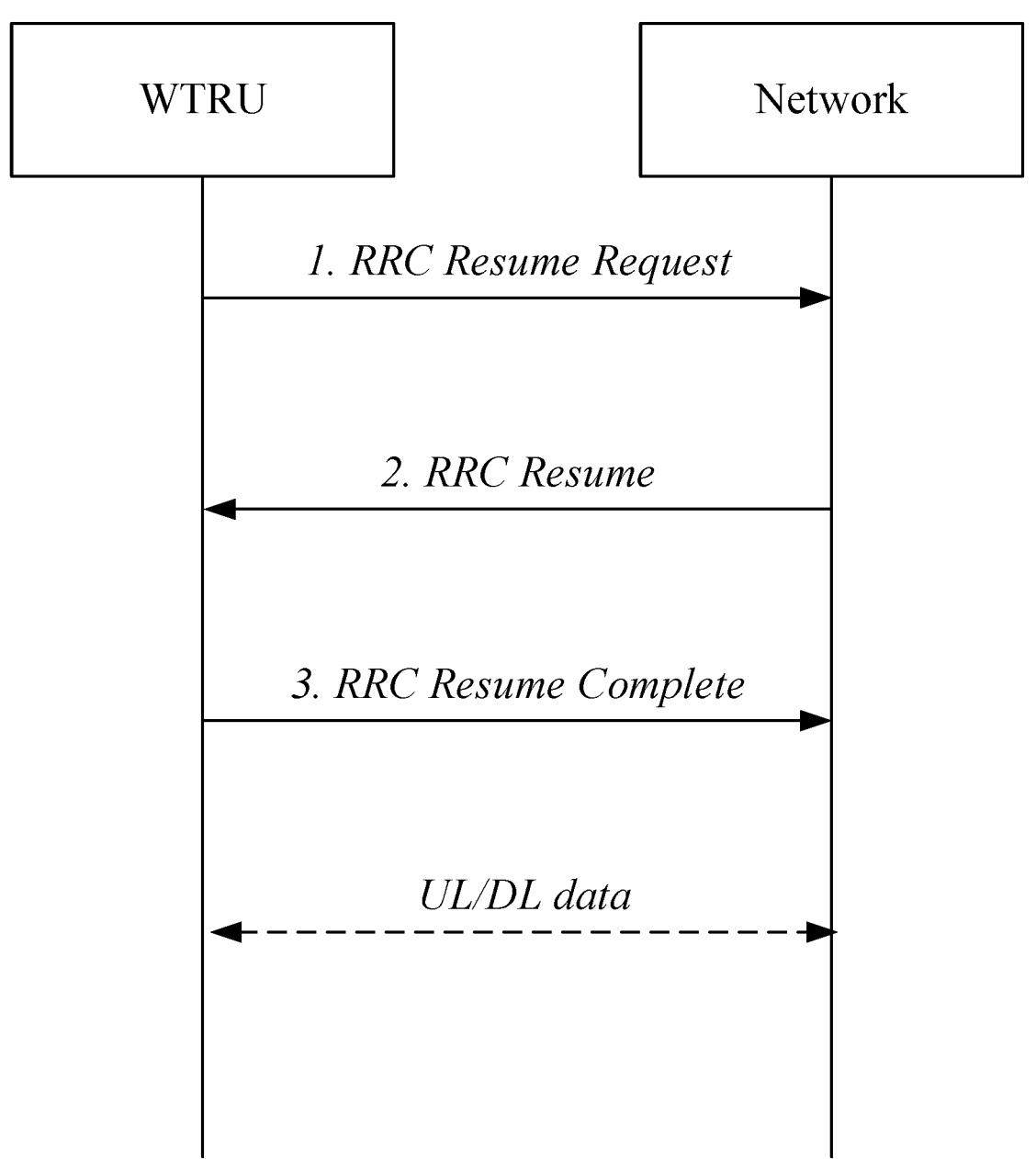
FIG. 5 illustrates an example of the WTRU transitioning from the RRC INACTIVE state to the RRC CONNECTED state.

FIG. 5 illustrates an example of the WTRU transitioning from the RRC INACTIVE state to the RRC CONNECTED state. The network may send the WTRU to the INACTIVE state by sending it a RRCRelease message that includes a suspension configuration (known as suspendConfig). The suspendConfig may include the WTRU identifier to be used if resuming the connection, a RAN area configuration, security information to be used for securing the resume procedure, and a paging configuration (e.g., for paging from the RAN instead of the CN as compared to the IDLE state). The RAN area configuration may include a list of cells (e.g., PCIs) or tracking area codes. The RAN area configuration may (e.g., may also optionally) include a periodic RAN area time (e.g., via a timer configuration). The WTRU may perform cell re-selection as a WTRU in the RRC IDLE state and may (e.g., may also) monitor the paging channel using the configured RAN paging information.

The WTRU may initiate a connection resume procedure in at least one of the following cases: if the WTRU detects a paging request in the paging channel that is associated with the WTRU resume identity (e.g., incoming voice or data call); if the WTRU has to send an UL data transmission (e.g., arrival of UL data from higher layers, voice call initiation, etc.); if a cell re-selection procedure leads to a re-selection to a cell outside the configured RAN area; or if the periodic RAN area update timer is configured and a time duration equal to a configured timer value has elapsed since the last RAN area update (or since the WTRU was sent to the RRC INACTIVE state).

The WTRU may initiate a resume procedure by sending a RRCResumeRequest message. The RRCResumeRequest message may include information regarding the WTRU resuming identity and the cause for the connection resumption (e.g., mobile originated voice call, mobile originated video call, mobile terminated call as indicate by paging, emergency, RAN area update due to re-selection outside the current RAN area or expiry of timer, etc.).

In the case of a RAN area update, the network may (e.g., may immediately) send the WTRU back to the INACTIVE state by sending a RRCRelease message (e.g., which may include a new WTRU resume identity, RAN area configuration, or security and paging configuration). The network may respond with the RRCResume message that may indicate to the WTRU to resume the radio connection and that a UL/DL transmission may proceed afterwards (e.g., immediately afterwards). The resumption from an RRC INACTIVE state may save the WTRU and the network a considerable signaling and may (e.g., may also) reduce the latency for the resumption of data transmission/reception from or to the WTRU (e.g., compared to the signaling for setting up a connection from the RRC IDLE state).

Figure 6:
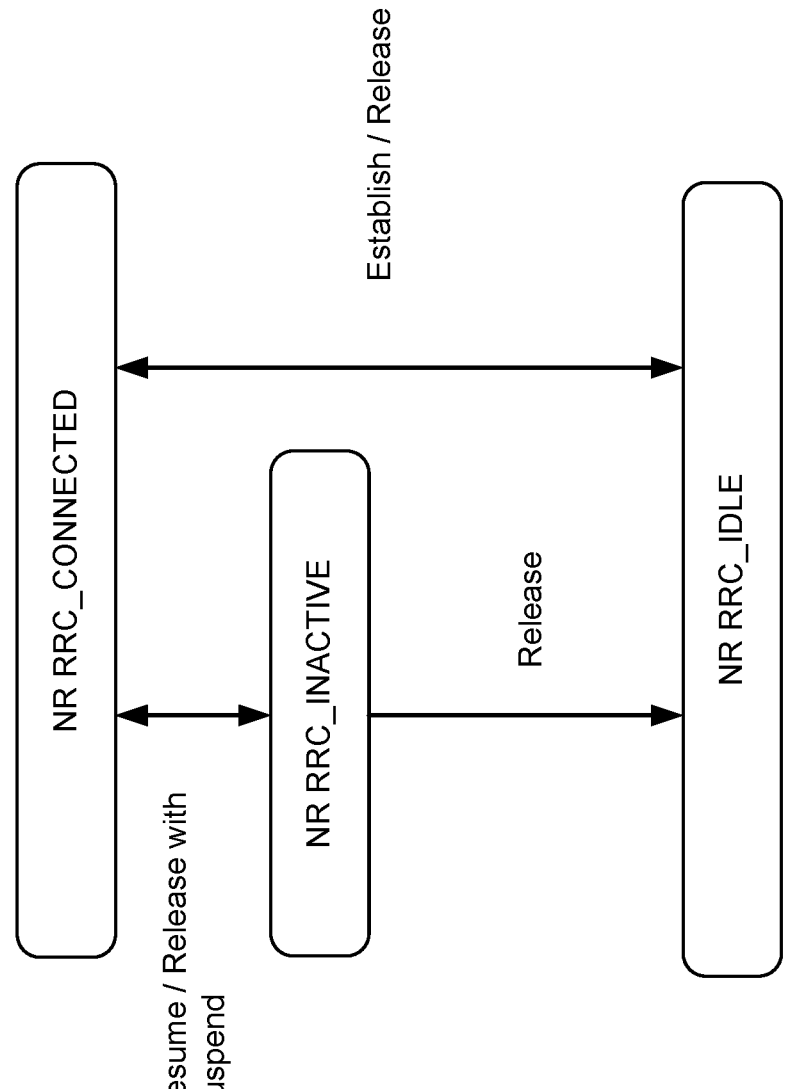
FIG. 6 illustrates an example of a WTRU transitioning between RRC IDLE, RRC INACTIVE, and RRC CONNECTED states.

FIG. 6 illustrates an example of a WTRU transitioning between RRC IDLE, RRC INACTIVE, and RRC CONNECTED states. The WTRU may (e.g., may also) transition from the RRC INACTIVE state to the RRC IDLE state. In examples, the WTRU may transition from the RRC INACTIVE state to the RRC IDLE state if the WTRU requests a connection resumption but the network has no resources available to accommodate that user.

Examples of NR sidelink relays are provided herein. Both WTRU to network relays and WTRU to WTRU relays based on PC5 (sidelink) may be provided. A version of NR sidelink may focus on supporting V2X related road safety services. The version may provide support for broadcast, groupcast, and unicast communications in both out-of-coverage and in-network coverage scenarios. Sidelink-based relaying functionality may provide a sidelink/network coverage extension and power efficiency improvement. Sidelink-based relaying functionality may consider a wider range of applications and services. Examples of coverage extension for sidelink-based communication may include a WTRU-to-network coverage extension and a WTRU-to-WTRU coverage extension. WTRU-to-network coverage extension may provide Uu coverage reachability, which may allow for WTRUs to reach a server in a PDN network or a counterpart WTRU out of a proximity area. The WTRU-to-network relay may not be applied to an NR-based system (e.g., for both NG-RAN and NR-based sidelink communication) due to the WTRU-to-network relay being limited to EUTRA-based technology. WTRU-to-WTRU coverage extension may limit proximity reachability to a single-hop sidelink link (e.g., either via EUTRA-based or NR-based sidelink technology). The limited proximity reachability may not be sufficient in the scenario where there is no Uu coverage, considering the limited single-hop sidelink coverage. Overall, sidelink connectivity may be extended in NR framework, in order to support the enhanced QoS requirements.

Relay selection/reselection for ProSe (Proximity Service) WTRU to NW relays may be performed based on a combination of an AS layer quality measurements (RSRP) and upper layer criteria. The eNB may control whether the WTRU can act as a ProSe WTRU-to-Network Relay. If the eNB broadcasts information (e.g., any information) associated to ProSe WTRU-to-Network Relay operation, the ProSe WTRU-to-Network Relay operation may be supported in the cell. The eNB may provide indication(s) of least one of: transmission resources for the ProSe WTRU-to-Network Relay discovery using broadcast signaling for RRC_IDLE state and dedicated signaling for RRC CONNECTED state; reception resources for the ProSe WTRU-to-Network Relay discovery using broadcast signaling; or a minimum and/or a maximum Uu link quality (RSRP) threshold(s) that the ProSe WTRU-to-Network Relay may respect before it can initiate a WTRU-to-Network Relay discovery procedure. In RRC IDLE, if the eNB broadcasts transmission resource pools, the WTRU may use the threshold(s) to autonomously start or stop the WTRU-to-Network Relay discovery procedure. In RRC CONNECTED, the WTRU may use the threshold(s) to determine if the WTRU can indicate to the eNB that the WTRU is a Relay WTRU and wants to start a ProSe WTRU-to-Network Relay discovery. If the eNB does not broadcast transmission resource pools for the ProSe-WTRU-to-Network Relay discovery, a WTRU may initiate a request for ProSe-WTRU-to-Network Relay discovery resources by dedicated signaling (e.g., respecting these broadcasted threshold(s). If the ProSe-WTRU-to-Network Relay is initiated by broadcast signaling, it may perform ProSe WTRU-to-Network Relay discovery if in a RRC IDLE state. If the ProSe WTRU-to-Network Relay is initiated by dedicated signaling, it may perform relay discovery if it is in the RRC CONNECTED state.

A ProSe WTRU-to-Network Relay performing sidelink communication for ProSe WTRU-to-Network Relay operation may be in the RRC CONNECTED state. If the ProSe WTRU-to-Network Relay receives a layer-2 link establishment request or TMGI monitoring request (e.g., upper layer message) from the served WTRU, the ProSe WTRU-to-Network Relay may indicate to the eNB that it is a ProSe WTRU-to-Network Relay and intends to perform ProSe WTRU-to-Network Relay sidelink communication. The eNB may provide resources for ProSe WTRU-to-Network Relay communication.

The served WTRU may decide when to start monitoring for a ProSe WTRU-to-Network Relay discovery. The served WTRU may transmit the ProSe WTRU-to-Network Relay discovery solicitation messages while in the RRC IDLE state or in the RRC CONNECTED state depending on the configuration of resources for ProSe WTRU-to-Network Relay discovery. The eNB may broadcast a threshold, which may be used by the served WTRU to determine if the served WTRU can transmit the ProSe WTRU-to-Network Relay discovery solicitation messages to connect or communicate with the ProSe WTRU-to-Network Relay WTRU. The RRC CONNECTED served WTRU may use the broadcasted threshold to determine if the RRC CONNECTED served WTRU can indicate to the eNB that it is a served WTRU and wants to participate in ProSe WTRU-to-Network Relay discovery or communication. The eNB may provide transmission resources using broadcast or dedicated signaling and reception resources using broadcast signaling for ProSe WTRU-to-Network Relay Operation. The served WTRU may stop using the ProSe WTRU-to-Network Relay discovery and communication resources if RSRP goes above the broadcasted threshold.

The served WTRU may perform radio measurements at a PC5 interface and use them for ProSe WTRU-to-Network Relay selection and reselection along with higher layer criterion. A ProSe WTRU-to-Network Relay may be considered suitable in terms of radio criteria if the PC5 link quality exceeds a configured threshold (e.g., pre-configured or provided by the eNB). The served WTRU may select the ProSe WTRU-to-Network Relay, which may satisfy higher layer criterion and have the best PC5 link quality among suitable (e.g., all suitable) ProSe WTRU-to-Network Relays.

The served WTRU may trigger ProSe WTRU-to-Network Relay reselection if PC5 signal strength of the current ProSe WTRU-to-Network Relay is below configured signal strength threshold the served WTRU receives a layer-2 link release message (e.g., upper layer message) from the ProSe WTRU-to-Network Relay.

Figure 7:
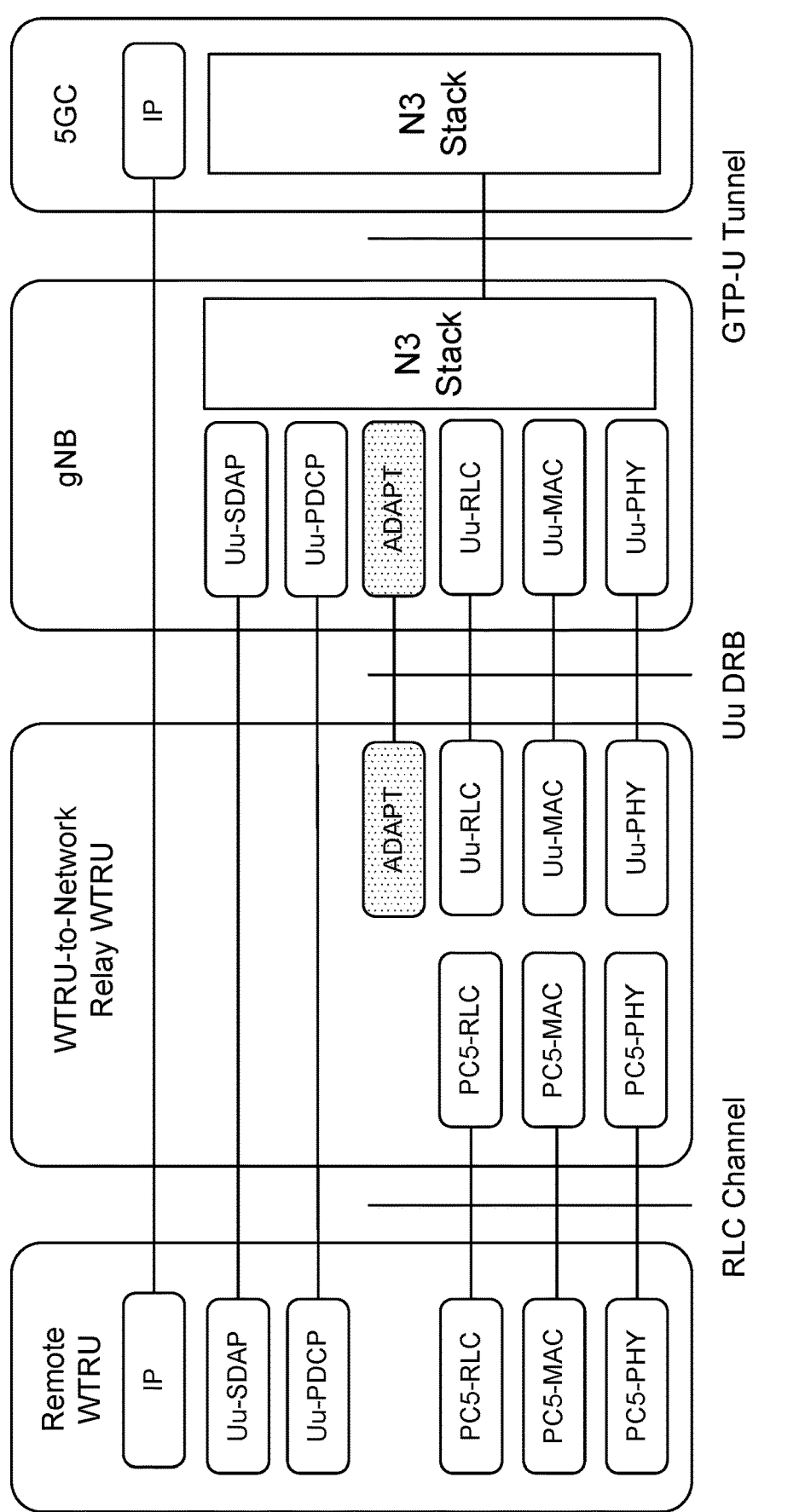
FIG. 7 illustrates an example of a user plane stake for NR L2 WTRU-to-Network Relay.
Figure 8:
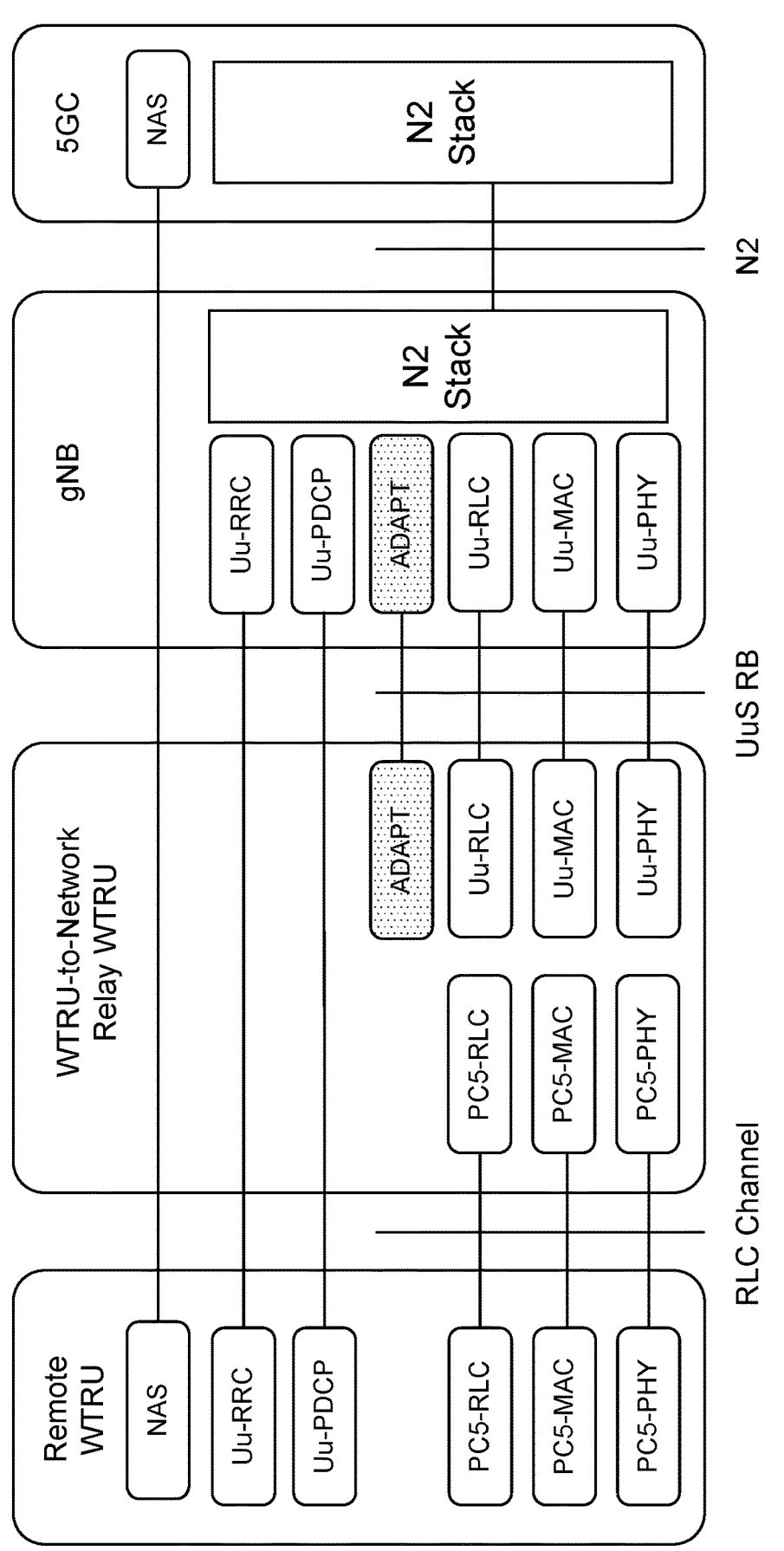
FIG. 8 shows an example of a control plane protocol stack for L2 WTRU-to-Network Relay.

FIG. 7 illustrates an example of a user plane stake for NR L2 WTRU-to-Network Relay. FIG. 8 illustrates an example of a control plane protocol stack for L2 WTRU-to-Network Relay. For the L2 WTRU-to-Network Relay, the adaptation layer may be placed over a RLC sublayer for both CP and UP at the Uu interface between the relay WTRU and gNB. The Uu SDAP/PDCP and RRC may be terminated between the served WTRU and gNB, while RLC, MAC and PHY may be terminated in each link (e.g., the link between the served WTRU and WTRU-to-Network Relay WTRU and the link between the WTRU-to-Network Relay WTRU and the gNB). In examples, there may be an adaptation layer at the PC5 interface between the served WTRU and relay WTRU. In examples, there may not be an adaptation layer at the PC5 interface between the served WTRU and relay WTRU.

For the UL of the L2 WTRU-to-Network Relay, the Uu adaptation layer at the relay WTRU may support an UL bearer mapping between ingress PC5 RLC channels for relaying and egress Uu RLC channels over the relay WTRU Uu path. For uplink relaying traffic, the different end-to-end RBs (SRB, DRB) of the same served WTRU or different served WTRUs may be subject to N:1 mapping and data multiplexing over a Uu RLC channel. The Uu adaptation layer may be used to support served WTRU identification for the UL traffic (e.g., multiplexing the data coming from multiple served WTRUs). The identity information of a served WTRU Uu radio bearer and a served WTRU may be included in the Uu adaptation layer at the UL in order for the gNB to correlate the received data packets for the specific PDCP entity associated with the right served WTRU Uu radio bearer of a served WTRU.

For the DL of the L2 WTRU-to-Network Relay, the Uu adaptation layer may be used to support DL bearer mapping at the gNB to map end-to-end Radio Bearer (SRB, DRB) of served WTRU into the Uu RLC channel over the relay WTRU Uu path. The Uu adaptation layer may be used to support DL N:1 bearer mapping and data multiplexing between multiple end-to-end Radio Bearers (SRBs, DRBs) of a served WTRU or different served WTRUs and a Uu RLC channel over the relay WTRU Uu path. The Uu adaptation layer may support a served WTRU identification for DL traffic. The identity information of the served WTRU Uu radio bearer and the identity information of the served WTRU may be put into the Uu adaptation layer by the gNB at the DL in order for the relay WTRU to map the received data packets from the served WTRU Uu radio bearer to its associated PC5 RLC channel.

Examples of measurements in NR are provided herein. Examples of measurements on Uu are provided herein. In the RRC CONNECTED state, the WTRU may measure at least one beam (e.g., multiple beams) of a cell. The measurements results (e.g., power values) may be averaged to derive the cell quality. When measuring, the WTRU may be configured to consider a subset of the detected beams. Filtering may take place at different levels (e.g., two different levels), such as at the physical layer to derive beam quality and at the RRC level to derive cell quality from multiple beams. Cell quality from beam measurements may be derived in the same way for the serving cell(s) and for the non-serving cell(s). Measurement reports may include the measurement results of the number of best beams if the WTRU is configured to do so by the gNB. The measurement reporting configuration may be either event triggered or periodical. If the measurement reporting configuration is periodical, the WTRU may send the measurement report every reporting interval (e.g., which may range between 120 ms and 30 min). For event triggered measurements, the WTRU may send the measurement report if the conditions associated with the event are fulfilled. The WTRU may keep on measuring the serving cell and neighbors report quantity and validate it with the threshold or offset defined in report configuration. The report quantity or the trigger for event may be RSRP, RSRQ, or SINR.

The following measurement events may be defined for NR. The intra-RAT events may be defined as: event A1 (e.g., serving cell becomes better than a threshold); event A2 (e.g., serving cell becomes worse than a threshold); event A3 (e.g., neighbor cell becomes offset better than SpCell); event A4 (e.g., neighbor cell becomes better than a threshold); event A5 (SpCell becomes worse than threshold1 and neighbor cell becomes better than threshold2); and event A6 (e.g., neighbor cell becomes offset better than SCell).

Event A1 may be used to cancel an ongoing handover procedure. This may occur if a WTRU moves towards the cell edge and triggers a mobility procedure, but (e.g., then subsequently) moves back into good coverage before the mobility procedure has completed.

Event A2 may not involve any neighbor cell measurements. Event A2 may be used to trigger a blind mobility procedure. The network may not configure the WTRU for neighbor cell measurements until the network receives a measurement report that is triggered due to event A2 (e.g., not perform neighbor cell measurement if the serving cell quality is good enough) (e.g., in order to save the WTRU's battery).

Event A3 may be used for handover procedure. A Spcell (e.g., special cell) may be the primary serving cell of either the Master Cell Group (MCG) (e.g., the PCell), or Secondary Cell Group (SCG) (e.g., the PSCell). In DC operation, the Secondary Node (SN) may configure an A3 event for a SN triggered PSCell change.

Event A4 may be used for handover procedures. The handover procedures may not depend on the coverage of the serving cell (e.g., load balancing, where the WTRU may be handed over to a good neighbor cell even if the serving cell conditions are excellent).

Event A5 may be used for handover. Event A5 may provide a handover triggering mechanism based on absolute measurements of the serving and neighbor cell. Event A5 may be suitable for time critical handover if the serving cell becomes weak and the serving cell changes towards another cell which may not satisfy the criteria for an event A3 handover.

Event A6 may be used for SCell addition or releasing.

Inter-RAT events may be defined as: event B1 (e.g., inter RAT neighbor cell becomes better than a threshold); and event B2 (e.g., PCell becomes worse than thershold1 and inter RAT neighbor becomes better than threshold2). Event B1 may relate (e.g., may be equivalent) to A4, but for the case of inter-RAT handover. Event B2 may relate (e.g., may be equivalent) to A5, but for the case of inter-RAT handover.

The WTRU's measurement configuration may include a s-measure configuration (s-MeasureConfig). The s-measure configuration may specify a threshold for NR SpCell RSRP measurement controlling if the WTRU is required to perform measurements on non-serving cells. The value may be a threshold corresponding to ssb-RSRP (e.g., corresponding to cell RSRP based on SS/PBCH block) or a choice of csi-RSRP (e.g., corresponding to cell RSRP of CSI-RS). If the measured SpCell SSB or CSI RSRP is above the threshold, the WTRU may not perform measurements on non-serving cells, improving WTRU power consumption (e.g., WTRU does not perform unnecessary measurements if the WTRU has very good radio conditions towards the serving cells).

Measurements may be performed on the sidelink. The WTRU may configure the associated peer WTRU to perform NR sidelink measurement and report on the corresponding PC5-RRC connection in accordance with the NR sidelink measurement configuration for unicast by RRCReconfigurationSidelink message.

The following measurement events may be defined for NR sidelink: event S1 (e.g., serving cell becomes better than a threshold); and event S2 (e.g., serving cell becomes worse than a threshold). The event S1 and event S2 based measurement (e.g., measurement reports) may be used by the WTRU receiving the report to adjust the power level when transmitting data. NR sidelink transmissions may have the following two modes of resource allocations: mode 1 (sidelink resources are scheduled by a gNB); mode 2 (the WTRU autonomously selects sidelink resources from a pre-configured sidelink resource pool(s) based on the channel sensing mechanism). For the in-coverage WTRU, WTRUs may be configured to operate in mode 1 or mode 2. An out-of-coverage WTRU may operate in (e.g., only in) mode 2.

To enhance QoS of NR sidelink transmissions, congestion control may be performed (e.g., especially in mode 2) to prevent a transmitting WTRU from occupying too many resources in sidelink transmissions. Two metrices may be defined for this purpose: Channel Busy Ratio (CBR) and Channel Occupation Ratio (CR). The CBR may be defined as the portion of subchannels whose RSSI exceeds a pre-configured value over a certain time duration. Considering a particular slot n, the CR may be defined as (X+Y)M, where X is the number of the subchannels that have been occupied by a transmitting WTRU within [n–a, n–1], Y is the number of the subchannels that have been granted within [n, n+b], and M is the total number of subchannels within [n–a, n+b].

For congestion control, an upper bound of CR denoted by CRlimit may be imposed to a transmitting WTRU, where the CRlimit is a function of CBR and the priority of the sidelink transmissions. The amount of resources occupied by a transmitting WTRU may not exceed the CRlimit. The CBR report may (e.g., may also) be used by the gNB to determine the pool of resources allocated to sidelink communication (e.g., increase the pool of resources if the WTRUs involved in sidelink communication are reporting high CBRs, decrease the pool of resources if the CBRs reported are low, etc.).

Peer WTRUs involved in sidelink operation may config-ure each other for measurement (e.g., either periodical or S1/S2 events) for in coverage operation (e.g., the served WTRU may be within the coverage of the gNB). The gNB may configure the served WTRU with CBR measurements, which may (e.g., may also) be either periodical or event triggered. The following two measurement events can be configured for CBR measurement reporting: event C1 (e.g., a CBR of NR sidelink communication becomes better than an absolute threshold); and event C2 (e.g., a CBR of NR sidelink communication becomes worse than an absolute threshold).

The relay WTRU and the served WTRU may support different PLMNs. The relay WTRU may support a PLMN set (e.g., a, b, c) while a served WTRU may belong to PLMN a only. If the relay WTRU is handed over or performs cell re-selection (e.g., in case the relay WTRU was in RRC INACTIVE or RRC IDLE mode), as that can be supported (e.g., for an intermediate relay WTRU in the case of mul-tihop) to a cell that belongs to PLMN b, the served WTRU may not be served by the relay WTRU anymore (e.g., even though the PC5 between them may be in excellent radio conditions). This may happen even though the improvement in handing over the relay WTRU to the target cell may not be significant or there was another candidate cell that belongs to a PLMN supported by the served WTRU that has radio conditions that may be worse (e.g., may only be marginally worse) than the final chosen target cell. The situation may be problematic in the case of cell-reselection while the relay WTRU is in RRC IDLE/INACTIVE mode, as the cell re-selection may be done based on signal levels by the relay WTRU and the network may not intervene to stop it from happening.

While a RRC INACTIVE served WTRU is connected with the relay WTRU, the relay WTRU may perform a HO or cell re-selection to a cell that is outside the RAN area configuration of the WTRU. If there are multiple such WTRUs (e.g., the multi-hop scenario), this may result in a signaling storm in order for the affected WTRUs (e.g., all the affected WTRUs) to do a 2-step resume procedure to per-form RAN area update procedures (e.g., all the RAN area update procedures) one by one. This may happen even though the improvement in handing over the relay WTRU to the target cell may not be significant, or there was another candidate cell that belongs to the RAN area supported by the served WTRUs which has radio conditions that are compa-rable (e.g., only marginally worse) than the final chosen target cell. The situation may be problematic (e.g., even more problematic) in the case of cell-reselection while the relay WTRU is in RRC IDLE/INACTIVE mode, as the cell re-selection may be done based on signal levels by the relay WTRU and the network may not intervene to stop it from happening.

While a served WTRU may be connected with the relay WTRU, the relay WTRU may perform a HO or cell re-selection to a cell that a served WTRU is not capable of operating at. The relay WTRU may perform a HO or cell-reselection to a cell that has properties/configurations (e.g., frequency, bandwidth, BWPs, etc.) that a served WTRU may not be capable of supporting. The HO or cell re-selection may trigger implicit cell (e.g., a multitude of implicit) cell re-selections (e.g., for RRC IDLE and RRC INACTIVE served WTRUs or child relay WTRUs) or HOs (e.g., for served WTRUs or child relay WTRUs that are in RRC CONNECTED mode). This may happen even though the improvement in handing over the relay WTRU to the target cell may not be significant, or there was another candidate cell that was able to support (e.g., support most of) the served WTRUs and relay WTRUs that the relay WTRU was serving directly or indirectly.

Examples for connection establishment in multihop WTRU to NW relays are provided herein. A relay WTRU acting as an intermediate WTRU in a multihop WTRU to NW relay link may itself be associated with an Uu RRC state.

Figure 9:
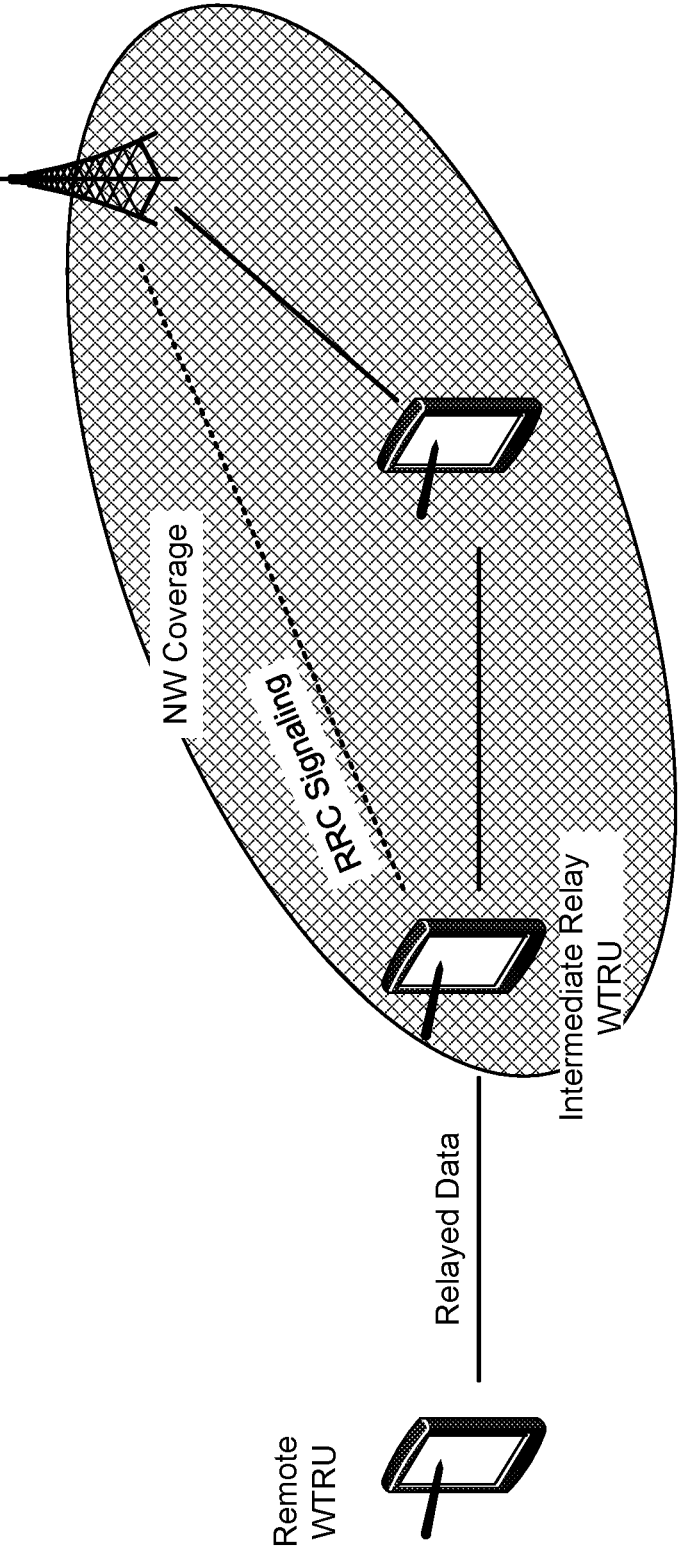
FIG. 9 illustrates an example of a relay WTRU in coverage with a traditional RRC connected via Uu.

FIG. 9 illustrates an example of a relay WTRU in cov-erage with a traditional RRC connected via Uu. The relay WTRU may be in RRC CONNECTED, RRC IDLE, or RRC INACTIVE states. The relay WTRU may (e.g., may further) be configured to perform a multihop WTRU to a NW relaying for a served WTRU (e.g., via a relayed path), in one or more RRC states (e.g., or all of these RRC states). In examples, the relay WTRU may be in the RRC INACTIVE state, but may serve an active remote WTRU that is in the RRC CONNECTED state, where a sidelink connection between the inactive relay WTRU and another relay WTRU may be used for forwarding the served WTRU's communi-cation without the intermediate relay WTRU being in the RRC CONNECTED state.

Figure 10:
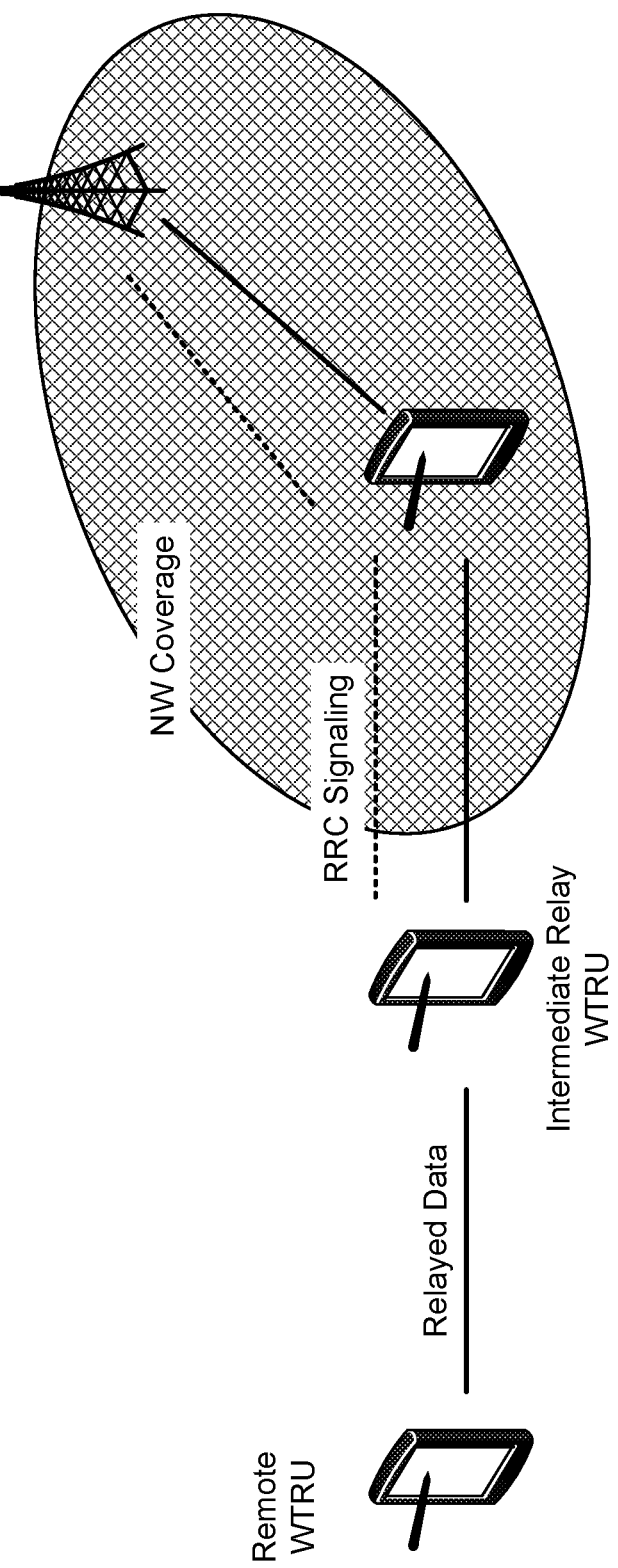
FIG. 10 illustrates an example of a relay WTRU out of coverage with the signaling/maintenance of the RRC state entirely via the relayed path.

FIG. 10 illustrates an example of a relay WTRU out of coverage with the signaling or maintenance of the RRC state entirely via the relayed path. The relay WTRU may have a RRC state with respect to Uu. The relay WTRU may be in RRC CONNECTED, RRC IDLE, or RRC INACTIVE states. The relay WTRU may (e.g., may further) be config-ured to perform a multihop WTRU to a NW relaying for a served WTRU (e.g., via a relayed path), in one or more (e.g., or all of these RRC states). In examples, the relay WTRU may be in the RRC INACTIVE state, but may serve an active served WTRU that is in the RRC CONNECTED state, where a sidelink connection between the inactive relay WTRU and another relay WTRU may be used for forward-ing the served WTRU's communication without the inter-mediate relay WTRU being in the RRC CONNECTED state.

The path which the RRC signaling may take differs in the examples shown in FIG. 9 and FIG. 10. In the example shown in FIG. 9, the relay WTRU may be scheduled (e.g., via Uu) for sidelink transmissions using mode 1 (e.g., NW scheduled) SL scheduling mode. The example shown in FIG. 9 may allow the RRC signaling/connection for the intermediate relay to go either during the direct path, or the indirect path.

A RRC connection, or the RRC state associated with the intermediate relay WTRU may be assumed to refer to any of the examples described herein. The examples described herein may apply equally to a WTRU to network relay (e.g., where the source/destination may be a network node) and to a WTRU to WTRU relay (e.g., where the source/destination may be another WTRU). The term parent relay may be used to refer to a relay WTRU that is serving a given relay WTRU (e.g., child relay) for sending data in the upstream and receiving data in the downstream (e.g., for the case of U2N relaying). For the case of U2U relay, the terms upstream and downstream may be interchangeable, depending on the direction of flow from one WTRU to another. For the case of U2U relay, the terms parent and child may (e.g., may also) be interchangeable. The term intermediate relay WTRU may be used to refer to a relay WTRU that is serving another WTRU or relay WTRU, but may (e.g., may also) be served by another relay WTRU. The term final relay WTRU may be used to describe a relay WTRU that may be served directly by a gNB cell. The term served WTRU may be used to refer to a served WTRU, a remote WTRU, or a relay WTRU (e.g., in the case of multi-hop) that is being served by a relay WTRU. The term directly served WTRU may be used to refer to a served WTRU that is directly connected to the relay WTRU. The term indirectly served WTRU may be used to refer to a served WTRU that is served by a relay WTRU that is directly served by the relay WTRU (e.g., one or more hops away from the relay WTRU). The terms state and mode may be used interchangeably (e.g., CONNECTED mode, CONNECTED state, etc.).

FIG. 11 shows an example of a relay WTRU determining a behavior of the relay WTRU to implement (e.g., the behavior may be associated with an action of the relay WTRU towards a neighbor cell). The determined behavior may be associated with handover, cell re-selection, and related measurements. The determination of the behavior may take characteristic(s) of remote WTRU(s) (e.g., respective characteristic(s) of respective remote WTRU(s)) and/or child WTRU(s) into consideration. Examples of such characteristic(s) may include at least one of: a supported PLMN, a configured RAN area, or a WTRU capability(ies) of the remote WTRU (e.g., each WTRU of a number of remote WTRU(s) may have respective characteristics). In examples, the relay WTRU may (e.g., may also) take the characteristic(s) of child relay WTRU(s) into consideration. Relay WTRU(s) may be configured to know (e.g., receive information) that indicates the (e.g., respective) character-istic(s) associated with the remote WTRU(s) (e.g., each of a number of remote WTRUs). The relay WTRU(s) may be configured to know (e.g., receive information) that indicates at least one of the following for each respective remote WTRU: a respective supported PLMN(s), a respective con-figured RAN area, or respective remote WTRU capabilities associated with respective remote WTRU(s) (e.g., each of a number of remote WTRU(s)) (e.g., as shown in FIG. 11). In examples, a respective remote WTRU capability may include at least one of: a supported frequency; or a supported bandwidth.

In examples, the relay WTRU may receive a first char-acteristic (e.g., a supported PLMN) associated with a first remote WTRU, a second characteristic (e.g., a configured RAN area) associated with a second remote WTRU, and a third characteristic (e.g., a remote capability) associated with a third remote WTRU. In examples, the relay WTRU may receive first and third characteristics (e.g., a supported PLMN and a remote capability) associated with a first remote WTRU, first and second characteristics (e.g., a supported PLMN and a configured RAN area) associated with a second remote WTRU, and second and third charac-teristics (e.g., a configured RAN area and a remote capabil-ity) associated with a third remote WTRU.

In examples, relay WTRU(s) may be configured to know (e.g., receive) the information on the (e.g., respective) supported PLMN(s), (e.g., respective) RAN area related information, or (e.g., respective) WTRU capabilities of their served WTRU(s) (e.g., remote WTRU(s)) that the relay WTRU has an active PC5 link with. This may be realized in several ways, such as by one or more of the following: a served (e.g., a remote) WTRU may indicate the concerned information (e.g., characteristic(s) to the relay WTRU, (e.g., during PC5 establishment); a served (e.g., a remote) WTRU may indicate the concerned information (e.g., characteristic (s)) after PC5 establishment in a PC5-RRC message; or a relay WTRU may be configured by the network (e.g., via a Uu RRC message) about the concerned information (e.g., characteristic(s)) of served (e.g., remote) WTRUs. The served (e.g., the remote) WTRU indicating the concerned information (e.g., characteristic(s)) to the relay WTRU dur-ing PC5 establishment may be based on at least one of: a configuration from the network to include that information in the PC5 setup; an autonomous decision by the served WTRU (e.g., remote WTRU); or based on a request by the relay WTRU during the PC5 setup procedure. The served WTRU (e.g., the remote WTRU) indicating the concerned information (e.g., characteristic(s)) after PC5 establishment in a PC5-RRC message may be a push message without a request from the relay WTRU (e.g., based on autonomous decision by the served WTRU or based on a configuration from the network to do so after the PC5 establishment) or as a response message on a request from the relay WTRU.

The relay WTRU configured by the network (e.g., Uu RRC message) about the concerned info of their served (e.g., a remote) WTRUs may be a push message from the gNB or on request from the relay WTRU regarding a specific served (e.g., a remote) WTRU.

In examples, the PC5 WTRUCapabilityEnquirySidelink and WTRUCapabilityInformationSidelink are enhanced so that non-sidelink related capability could also be included (e.g., a flag added in the enquiry message indicating to the remote WTRU to send the non-sidelink related WTRU capabilities).

In examples, a subset (e.g., only a subset) of the WTRU capabilities may be requested (e.g., a flag or set of flags indicating which capability information is needed, or flags or set of flags indicating which capability information is not needed). The information communicated to the relay WTRUs (e.g., in addition to the RAN area configuration) may include other RRC INACTIVE state information, such as the WTRU resume identity (e.g., full I-RNTI, short I-RNTI), the RAN paging cycle, the periodic RAN area update timer, the nextHopChainCount used for security key derivations, etc.).

If a relay WTRU selects or re-selects a cell while in the RRC IDLE/INACTIVE state or is handed over to a cell while in the RRC CONNECTED state, and this cell does not support a certain served WTRU, the relay WTRU may communicate this information to the served (e.g., the remote) WTRU. In examples, a WTRU may not be moni-toring (e.g., continuously monitoring) the PLMN informa-tion broadcasted by the cell, as that is information that is normally not expected to change in cases where the WTRU is directly connected or camped to a cell instead of via a sidelink relay. Informing the WTRU to become aware of such a PLMN change may ensure that the WTRU does not stay camped or connected to a cell that the WTRU has no registration at (e.g., this may cause a failure during a connection setup triggered due to an UL data arrival, or a scheduling request towards the network for sending an UL data while in connected state after being not actively communicating for a while (e.g., before the network has detected data inactivity and has decided to send the WTRU to the RRC IDLE or RRC INACTVE state).

The information communicated to the relay WTRUs may include INACTIVE state information (e.g., in addition to the RAN area related information) such as the WTRU resume identity (e.g., full I-RNTI, short I-RNTI), the RAN paging cycle, the periodic RAN area update timer, the nextHop-ChainCount used for security key derivations, etc.). Examples of constraints on Uu RRC states of relay WTRUs or served WTRUs (e.g., remote WTRUs) on communications of supported PLMNs, RAN areas, and WTRU capabilities are provided herein. The served WTRUs (e.g., remote WTRUs) may be configured to communicate their PLMNs, RAN area configuration, and/or WTRU capabilities to the relay WTRU regardless of their Uu RRC state. The served WTRUs (e.g., remote WTRUs) may be configured to communicate their PLMNs, RAN area configuration, and/or WTRU capabilities to the relay WTRU depending on their Uu RRC state (e.g., communicate only while in RRC_IDLE). The served WTRUs (e.g., remote WTRUs) may be configured to communicate their PLMNs, RAN area configuration, and/or WTRU capabilities to the relay WTRU on a transition from one Uu RRC state to another (e.g., on connection release to the RRC IDLE/INACTIVE state, on connection resume/setup, etc.).

The relay WTRUs may be configured to request the PLMNs, RAN area configuration, and/or WTRU capabilities of the served WTRUs (e.g., remote WTRUs) regardless of the relay WTRU's Uu RRC state. The relay WTRUs may be configured to request the PLMNs, RAN area configuration, and/or WTRU capabilities of the served WTRUs (e.g., remote WTRUs) depending on the relay WTRU's Uu RRC state (e.g., relay WTRU requests the info from served/remote WTRUs only when itself is in the RRC CONNECTED state). The relay WTRUs may be configured to request the PLMNs, RAN area configuration, and/or WTRU capabilities of the served WTRUs (e.g., remote WTRUs) on a transition from one Uu RRC state to another (e.g., the relay WTRU may request the info from served/remote WTRUs on connection resume/setup). The request from the relay WTRU's (or the push message from the served WTRU) may be dependent on the Uu RRC state of the relay WTRU and the served/remote WTRU (e.g., the relay WTRU may request the info of a served WTRU when the relay WTRU transitions to the RRC INACTIVE state while the served/remote WTRU is in the RRC IDLE state, etc.). Different behavior may be configured regarding the handling of child served WTRUs (e.g., remote WTRUs) and child relay WTRUs (e.g., behavior regarding child served WTRUs may not be dependent on the RRC state of the relay WTRU, but behavior regarding child remote relay WTRUs may be dependent on the RRC state of the relay WTRU).

Relay WTRUs may be configured to forward the information about the supported PLMNs, configured RAN area, or WTRU capabilities of their served WTRUs (e.g., remote WTRUs). In a multi-hop scenario, a relay WTRU may be configured to forward the concerned information (e.g., characteristic(s)) by a served WTRU (e.g., remote WTRU) in the upstream direction towards a parent relay WTRU (e.g., via a PC5-RRC message). This forwarding of the served (e.g., remote) WTRU's information may be triggered, for example: when the relay WTRU becomes aware of the concerned information (e.g., characteristic(s)) of a served WTRU for the first time; when the relay WTRU becomes aware that the concerned information (e.g., characteristic(s)) of a served WTRU has changed; based on a request from the parent relay WTRU; or based on other configurations (e.g., a periodic update).

If a PC5 towards a served WTRU (e.g., remote WTRU) is released, the relay WTRU may update the concerned information (e.g., characteristic(s) and forward it to the parent relay WTRU. The information forwarded to a parent relay WTRU may include information of (e.g., all) the served WTRUs (e.g., remote WTRUs) and relay WTRUs that are being served by the relay WTRU (e.g., all sent at the same level of hierarchy). For example, consider a scenario like FIG. 12.

FIG. 12 illustrates an example of served WTRUs (e.g., remote WTRUs) and relay WTRUs being served by the relay WTRU. Relay WTRU1 may send information like this to relay WTRU2: [WTRUa, list of supported PLMNs] [WTRUb, list of supported PLMNs] [relay WTRU1, list of supported PLMNs]. Relay WTRU2 may send an information like this to relay WTRU3: [WTRUa, list of supported PLMNs] [WTRUb, list of supported PLMNs] [relay WTRU1, list of supported PLMNs] [relay WTRU2, list of supported PLMNs]. Relay WTRU3 may not have hierarchical information and may not know if WTRUa and WTRUb are directly connected to relay WTRU2 or are more than one hop away from WTRU2.

Hierarchical information may (e.g., may also) be included. For example, relay WTRU2 may send information like this {own PLMNs, {level 1 PLMNs that include the directly served WTRU identities and PLMNs supported}, {level 2 PLMNs that include the WTRU identities and supported PLMNs of the WTRUs that are indirectly served by the relay WTRU and are one hop away}, {level 2 PLMNs that include the WTRU identities and supported PLMNs of the WTRUs that are indirectly served by the relay WTRU and are two hops away}, etc. The non-hierarchical or hierarchical information may include an indication of WTRU identities (e.g., C-RNTI for a served/remote WTRU in the RRC CONNECTED state, resumeIdentity for a WTRU in the RRC INACTIVE state, etc.). The non-hierarchical or hierarchical information may include summarized information showing how many of the WTRUs that the information is relevant to. For example, for the non-hierarchical example discussed above, the information may look something like {PLMN x: 2 WTRUs, PLMN y: 3 WTRUs, PLMN z: 10 WTRUs}.

Information regarding a configured RAN area that is forwarded to parent relay WTRU may consider one or more of the following: the RAN area configured for the relay WTRU itself (e.g., if the relay WTRU is also in the RRC INACTIVE state); the child relay WTRUs connected (e.g., directly connected) to the relay WTRU; served WTRUs (e.g., remote WTRUs) and relay WTRUs that are connected (e.g., directly connected) to the relay WTRU; served WTRUs (e.g., remote WTRUs) one hop away; etc. Information regarding a configured RAN area that is forwarded to parent relay WTRUs may consider one or more of the following: the WTRU capabilities of the relay WTRU itself; the WTRU capabilities of a child relay WTRUs directly connected to the relay WTRU; the WTRU capabilities of served WTRUs (e.g., remote WTRUs) and relay WTRUs that are directly connected to the relay WTRU; the WTRU capabilities of served WTRUs (e.g., remote WTRUs) one hop away; etc.

Relay WTRU(s) may receive configuration information associated with the relay WTRU(s). The received configuration information may include behavior(s) of the relay WTRU(s) associated with the neighbor cell, for example a behavior to implement based on a threshold of support by a neighbor cell as described herein (e.g., and as shown in FIG. 11). The configured behavior(s) of the relay WTRU(s) may be associated with (e.g., may configured the relay WTRU to perform or not perform) cell re-selection, handover measurements, or measurement reporting. A behavior may be determined by the relay WTRU based on a threshold of support by a neighbor cell for respective characteristic(s) of respective remote WTRUs, e.g., the determination may consider the respective PLMN(s) supported by respective served WTRUs (e.g., remote WTRUs) and/or child relay WTRUs that are supported by a neighbor cell. Relay WTRU(s) may determine whether a remote WTRU (e.g., each of a number of remote WTRU(s)) is supported by a neighbor cell. A relay WTRU may (e.g., as shown in FIG. 11) be configured to perform or not perform a determined behavior (e.g., cell re-selections or measurements for cell re-selection (e.g., while in IDLE/INACTIVE state)) towards a neighbor cell depending on the (e.g., respective) characteristic(s) of the respective WTRUs (e.g., respective supported PLMNs, respective supported RAN area, or respective WTRU capabilities of the served WTRU(s) (e.g., remote WTRU(s)) and the configuration or properties of a neighbor cell, for example whether or to what extent the neighbor cell supports the respective characteristic(s). The served WTRU(s) may be directly or indirectly served by the relay WTRU.

A served WTRU (e.g., a remote WTRU) may be determined to support a neighbor cell (or a neighbor cell is determined to support a served/remote WTRU) if the neighbor cell supports a characteristic(s) of a the remote WTRU, for example if one or more of the following are fulfilled: the neighbor cell supports the PLMN(s) supported by the WTRU; the neighbor cell is within the configured RAN area of the WTRU; or the WTRU is capable of operating within the neighbor cell (e.g., support the neighbor cell's frequency, bandwidth, etc.) (e.g., as shown in FIG. 11). As one possible illustration, a characteristic of a first remote WTRU may be that the first remote WTRU is associated with a first PLMN and a characteristic of a second remote WTRU may be that the second remote WTRU is associated with a second PLMN. A neighbor cell may support the first PLMN, but not the second PLMN. The relay WTRU may in such a case determine that neighbor cell supports the first WTRU and does not support the second WTRU.

The relay WTRU may determine a behavior of the relay WTRU based on at least the configuration information and a percentage of remote WTRU(s) that is supported by the neighbor cell. The determined behavior may be associated with the neighbor cell. In examples (e.g., where the neighbor cell does not support remote WTRU(s) associated with the relay WTRU, a threshold number/percentage of remote WTRU(s) associated with the relay WTRU, etc.), the determined behavior may include at least one of: disabling cell re-selection to the neighbor cell; disabling measurements on the neighbor cell; disabling sending a measurement report that is triggered due to the neighbor cell; or de-prioritizing measurements for the neighbor cell. The relay WTRU may implement the determined behavior associated with the neighbor cell. In examples, the relay WTRU may be configured to measure or perform cell re-selection towards cell(s) (e.g., only towards cell(s)) that are supported by at least a certain percentage threshold of the directly and/or indirectly served WTRU(s) (e.g., remote WTRU(s) (e.g., as shown in FIG. 11). In examples, a 100% threshold means that a cell may not be eligible for cell re-selection or cell re-selection measurements if even a served/remote WTRU (e.g., only one served/remote WTRU) does not support that cell, 50% means half of the served/remote WTRUs need to be supported by the cell, etc. Different percentage thresholds may be specified for the served/remote WTRUs that are directly served by the relay WTRU and those that are indirectly served. Configurations may also occur where different percentage thresholds are specified for each hop (e.g., directly connected, one hop away, two hops away, etc.), where the hop level percentage thresholds may be specified (e.g., explicitly specified) for each hop or based on some scaling.

In examples, the determined behavior of the relay WTRU may be based on the percentage of remote WTRU(s) that is supported by the neighbor cell being above or below a threshold. A first neighbor cell and a second a neighbor cell may be available. The relay WTRU may be connected to a first neighbor cell. If the percentage of remote WTRU(s) that is supported by the first neighbor cell is below the threshold, the determined behavior of the relay WTRU may be performing cell re-selection to the second neighbor cell. If the percentage of remote WTRU(s) that is supported by the first neighbor cell is above the threshold, the determined behavior of the relay WTRU may be performing a measurement of the first neighbor cell. In examples, the received configuration information may include a first behavior and a second behavior. The determined behavior of the relay WTRU may be the first behavior or the second behavior. If the percentage of remote WTRU(s) that is supported by the neighbor cell is above the threshold, the determined behavior of the relay WTRU may be the first behavior. If the percentage of remote WTRU(s) that is supported by the first neighbor cell is below the threshold, the determined behavior of the relay WTRU may be the second behavior.

The relay WTRU may be configured to prioritize the cells that are supported by the most served WTRUs (e.g., remote WTRUs). This may be specified, for example, by: a scaling factor or offset to the signal level towards cells being measured that may be dependent on the percentage of served WTRUs (e.g., remote WTRUs) that support the concerned cell; de-scaling/penalty factors depending on the percentage of WTRUs that may not support the concerned cell; or a signal level threshold/window, specifying a cell that is supported by more served WTRUs (e.g., remote WTRUs) may be chosen over another cell that is supported by a lower percentage of WTRUs, as long as the signal of the former is no worse than the signal of the latter by the configured threshold.

The prioritization or de-prioritization of the cells by the relay WTRU based on the support by served WTRUs (e.g., remote WTRUs) may be hop dependent, for example, by: considering remote (e.g., only remote) WTRUs directly connected to the relay WTRU; considering relay (e.g., only relay) WTRUs directly connected to the relay WTRU; considering served WTRUs (e.g., all served WTRUs and relay WTRUs that are directly connected to the relay WTRU); considering remote WTRUs (e.g., also remote WTRUs) one hop away; etc.

The relay WTRU may update the priorities of the PLMNs that the relay WTRU is configured with, depending on the PLMNs that the served WTRUs and relay WTRU are supporting. The PLMNs may directly or indirectly serve the served WTRUs (e.g., remote WTRUs) and the relay WTRU. For example, a relay WTRU may support two PLMNs, a and b, and a may be configured as a high priority PLMN. If most of the served WTRUs support only PLMN b, the relay WTRU may consider b to be the high priority PLMN. This may be either based on which one has more support or depend on a comparison between the different PLMNs. For example: the relay WTRU may use the original priority of PLMNs unless the highest priority PLMN supports less than x % of the served WTRUs; or the PLMN that is supported by more than x % of served WTRUs (e.g., x configured to 10%), as compared to the original high priority PLMN, may be considered the new high priority PLMN.

Examples of cell re-selection measurements described herein may be applied to the case of RRM measurements if the relay WTRU is the RRC CONNECTED state. A relay WTRU may be configured to perform or not perform neighbor measurements for handover (e.g., while in the RRC CONNECTED state) towards a particular neighbor cell. The relay WTRU may be configured to not send measurement reports that are triggered due to some configured thresholds (e.g., event A3 described above) being met by a given neighbor cell, depending on the level of support of the concerned cell by the served WTRUs (e.g., remote WTRUs).

Examples described herein may be applied to the RRM measurements in connected mode. In examples, this may involve: different minimum percentage thresholds of support by the served WTRUs (e.g., remote WTRUs) specified for a neighbor cell to be considered for RRM measurements (e.g., measure if (e.g., only if) more than 75% of the served WTRUs (e.g., remote WTRUs) support the same PLMN as the concerned cell, measure if (e.g., only if) more than 75% of the served WTRUs (e.g., remote WTRUs) have the concerned cell in their configured RAN area, measure if (e.g., only if) more than 90% of the served WTRUs (e.g., remote WTRUs) support the same frequency as the concerned cell); different minimum percentage thresholds of support by the served WTRUs (e.g., remote WTRUs) for a neighbor cell for that neighbor cell to trigger a measurement report (e.g., measurements performed as normal, but reported if (e.g., only if) the number of served WTRUs (e.g., remote WTRUs) that support the PLMN(s) of the concerned cell are above a configured percentage or if the percentage of served WTRUs supporting the concerned cell's frequency are above a configured percentage or if the percentage of the served WTRUs (e.g., remote WTRUs) that have the concerned cell in their RAN area is above a configured percentage, etc.); thresholds specified that scale the cell measurements up/down (or offsets specified) that are applied to the neighbor cell measurements, depending on the support level by the served WTRUs (e.g., remote WTRUs); etc.

The percentage levels (or scaling/offsets values) to be fulfilled may be hop specific or consider (e.g., all) the directly or indirectly served WTRUs (e.g., remote WTRUs). Different percentage levels (or scaling/offset values) may be associated with the level of support regarding PLMN, RAN area, and WTRU capabilities.

Relay WTRUs in the RRC CONNECTED mode may be configured to perform RAN area update related operations on behalf of the served WTRUs and child relay WTRUs that they are directly or indirectly serving. If a connected relay WTRU performs a handover to a cell (e.g., as shown in FIG. 11) that does not belong to a RAN area of a served WTRU, it may perform a RAN area update like procedure on behalf of the served WTRU. In examples, this may involve at least one of the following: the relay WTRU sending information equivalent to the information included in a resume request message that may be sent during a 2-step resume request for a RAN area update which may include the WTRU resume identity; the relay WTRU receiving a response information equivalent to the release message that may be sent in response to a 2-step resume request that is sent for RAN area update (e.g., which may include the new RAN area configuration, new WTRU resume identity for the served WTRU, paging cycle, etc.); or the relay WTRU that may pass this response information to the served WTRU (e.g., via a PC5-RRC message).

The response information (e.g., RAN area, WTRU resume identity, paging cycle, etc.) that may be forwarded to the served WTRU may be visible to the relay WTRU. The response information that may be forwarded to the served WTRU may be transparent to the relay WTRU (e.g., sent to the relay WTRU in a transparent OCTET container, possibly encrypted, which (e.g., only) the served WTRU may be able to understand).

The relay WTRU may send the RAN area update information about multiple served WTRUs towards the network in one message (e.g., including all the WTRU resume identities of the served WTRUs that the relay WTRU is directly or indirectly serving). The relay WTRU may receive the response information about multiple served WTRUs in one message (e.g., including all the new WTRU resume identities, the updated RAN area configurations, and the old resume identities for matching purposes).

In a multi-hop scenario, if a relay WTRU receives the response information for a given served WTRU that is not connected (e.g., directly connected) to it, the relay WTRU may pass on the information to a child relay WTRU that is directly or indirectly serving the served WTRU. The information may be propagated hop by hop until it reaches the concerned WTRU. For example, consider the scenario where served WTRU1 and WTRU2 are connected to relay WTRUa, and served WTRU3 and relay WTRUa are connected to relay WRTUb, which is further connected to relay WTRUc. Assuming that the target gNB cell is outside the configured RAN area of the WTRUs (e.g., all the WTRUs), relay WTRUc may send a message to indicate to the target gNB about the resume identities of relay WTRUb, relay WTRUa, served WTRU1, WTRU2, and WTRU3. In return, the relay WTRUc may get updated resume identities and RAN areas for these WTRUs and pass the information for relay WTRUb. Relay WTRUb may get the updated information for itself from this message and may pass the information regarding WTRU3 towards its connected WTRU (e.g., directly connected WTRU), and the rest of the information to WTRUa. From this message, WTRUa may get its updated information, and may pass the rest of the information to the concerned WTRUs WTRU1 and WTRU2.

The relay WTRU may send the RAN area update related information concerning the served WTRUs to the gNB in a HO complete message. The relay WTRU may send the RAN area update related information concerning the served WTRUs in a separate message after the HO is completed. The relay WTRU may send the RAN area update related information concerning the served WTRUs to the gNB in a measurement report (e.g., the event A3 triggered measurement event as described above) that is expected to trigger a handover. The relay WTRU may receive the response information including updated RAN area, WTRU identities, etc., for the concerned WTRUs in the HO command from the source gNB/cell. The relay WTRU may receive the response information including updated RAN area, WTRU identities, etc., for the concerned WTRUs from the target gNB/cell after the HO is completed.

Concerned WTRU(s) (e.g., each concerned WTRU) may generate a resume request for a RAN area update due to the HO of the relay WTRU to a cell not in the configured RAN area of the WTRU. The relay WTRU may collect the resume requests (e.g., all the resume requests) messages and send them to the network in one big message. This may be a list of resume request messages. The relay WTRU may collect the response message to the resume request messages for those WTRUs that are indirectly served and send them in one group message to the relay WTRU that is serving them. Concerned WTRUs (e.g., each concerned WTRU) may generate a resume request for a periodic RAN area update (e.g., as in legacy, if configured). The relay WTRU may collect these periodic updates from different WTRUs for a certain specified duration and send them to the network in one big message. In examples, the relay WTRU may be configured to not send RAN area update related information about its served WTRUs at most once every five minutes, which may delay a RAN area update for a given WTRU for up to five minutes (e.g., assuming it was received just after the previous one was sent by the relay WTRU), aggregate the RAN area update with any other update message sent by another WTRU, and send them all together.

The relay WTRU may be aware of the configured periodic RAN area update timer values of its served WTRUs. The relay WTRU may try to use this to determine on how often the WTRU forwards the periodic RAN area update messages. In examples, imaging served WTRU1 to WTRU are each configured with a 5 min timer value, but they were sent to the RRC INACTIVE state at times t1, t1+1 min, t1+2 min, t1+3 min, t1+4 min. Without any modification of the legacy behavior, RAN area updates may end up being sent to the network every 1 min (e.g., at t1+5 from WTRU1, t1+6 from WTRU2, t1+7 from WTRU3, t1+8 from WTRU4, t1+9 from WTRU5, t1+10 from WTRU0, etc.). The relay WTRU may (e.g., accordingly) delay the sending of the first aggregate message including the update from (e.g., all) the WTRUs at t1+9, the second one at t1+14, etc.).

Relay WTRUs in the RRC INACTIVE mode may be configured to perform RAN area update related operations on behalf of the served WTRUs and child relay WTRUs that they are directly or indirectly serving. If a relay WTRU in the RRC INACTIVE mode performs a RAN area update, it may include information related to its served WTRUs which do not have the target cell in their configured RAN area. For example, this may involve: the relay WTRU sending a resume request message to indicate a RAN area update which may include its own WTRU resume identity as well as the other concerned WTRUs which may (e.g., may also) need to update their RAN area; the relay WTRU receiving a release message which may include the updated information (e.g., the new WTRU identity, RAN area configuration, etc., for the relay WTRU, as well as all the concerned WTRUs); or the relay WTRU passing the updated information to the served WTRU(s) (e.g., via a PC5-RRC message).

The resume request that includes multiple identities may implicitly or explicitly indicate which identity belongs to the relay WTRU sending the message. The updated information that is to be forwarded to a served WTRU may be visible to the relay WTRU. The updated RAN area and the WTRU identity information that is to be forwarded to the served WTRU may be transparent to the relay WTRU (e.g., sent to the relay WTRU in a transparent OCTET container, possibly encrypted, which (e.g., only) the served WTRU is able to understand).

In a multi-hop scenario, if a relay WTRU receives the updated resume identity and RAN area configuration for a given served WTRU that is not directly connected to it, the relay WTRU may pass on the information to a child relay WTRU that is directly or indirectly serving the served WTRU. The information may be propagated hop by hop until it reaches the concerned WTRU. For example, consider the scenario where served WTRU1 and WTRU2 are connected to relay WTRUa, and served WTRU3 and relay WTRUa are connected to relay WTRUb, which is further connected to relay WTRUc. Assuming that the target gNB cell is outside the configured RAN area of (e.g., all) the WTRUs and the relay WTRUc itself, the relay WTRUc may initiate a 2-step resume procedure to indicate to the target gNB that includes its own resume identity as well as the identities of relay WTRUb, relay WTRUa, served WTRU1, WTRU2, and WTRU3. In return, the relay WTRUc may get updated resume identities and RAN areas for itself and the other WTRUs. The WTRUc may pass the information regarding the other WTRUs to relay WTRUb. Relay WTRUb may get the updated information for itself from this message. Relay WTRUb may pass the information regarding WTRU3 towards its directly connected WTRU and the rest of the information to WTRUa. From this message, WTRUa may get its updated information and may pass the rest of the information to the concerned WTRUs WTRU1 and WTRU2.

The relay WTRU may start the resume procedure for RAN area update on behalf of a served WTRU or relay WTRU that it is directly or indirectly serving, even if itself does not need to perform a RAN area update. This may be triggered if: the relay WTRU performs a cell re-selection to a cell (e.g., as shown in FIG. 11) that belongs in its own RAN area, but it does not belong to a served WTRU's RAN area; or a period of time expires (e.g., the timer for a periodic timer-based RAN area update for a served WTRU, if configured, expires). The relay WTRU may implicitly or explicitly indicate this information is on behalf of the children and not for itself (e.g., in this case). In examples, the resume identity of the relay WTRU may be included along with a flag (e.g., an additional flag) indicating this is not to update the RAN for the relay WTRU.

The relay WTRU may delay informing the network about the RAN area update of children WTRUs or relay WTRUs to reduce the number of RAN area update messages to be sent. For example, assume served WTRU1 is configured to send to the RRC INACTIVE state at t1 and served WTRU2 is sent to inactive state at t1+1 min, and both are configured to send a periodic RAN area update information every 5 min. This may result in RAN area updates being sent to the gNB at t1+5, t1+5, t1+10, t1+10, etc. The relay WTRU, (e.g., knowing the periodic timer configuration of both WTRUs), may decide to synch the RAN area update procedure of the two WTRUs, so that it may send the updates for both in one message every 5 min instead. The relay WTRU may track time (e.g., via a periodic RAN area timer). The WTRU may aggregate the update information (e.g., all the update information) from its served WTRUs during each update period. The relay WTRU may forward them in one group update message, including its own update, every time its own RAN area timer expires.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A method performed by a relay wireless transmit/receive unit (WTRU), comprising:
   receiving information associated with a plurality of remote WTRUs, wherein the information includes a first characteristic associated with a first remote WTRU and a second characteristic associated with a second remote WTRU;
   receiving configuration information associated with the relay WTRU;
   determining that the first remote WTRU and the second remote WTRU are supported by a cell, wherein the determination is based on the first characteristic and the second characteristic being supported by the cell;
   determining a behavior of the relay WTRU based at least on the configuration information and the first remote WTRU and the second remote WTRU being supported by the cell, wherein the determined behavior of the relay WTRU is associated with the cell; and
   performing the determined behavior associated with the cell.

2. The method of claim 1, wherein the determination of the behavior of the relay WTRU is further based on a percentage of the plurality of remote WTRUs that is supported by the cell.

3. The method of claim 2, wherein the determined behavior is further based on the percentage of the plurality of remote WTRUs that is supported by the cell being above or below a threshold.

4. The method of claim 2, wherein:
   the cell is a first cell,
   the relay WTRU is connected to the first cell,
   if the percentage of the plurality of remote WTRUs is below a threshold, the determined behavior is a cell reselection to a second cell, and
   if the percentage of the plurality of remote WTRUs is above the threshold, the determined behavior is a measurement of the first cell.

5. The method of claim 2, wherein:
   the configuration information indicates a first behavior if the percentage of the plurality of remote WTRUs is above a threshold and a second behavior if the percentage of the plurality of remote WTRUs is below the threshold, and
   the determined behavior is the first behavior or the second behavior.

6. The method of claim 1, wherein the determined behavior is associated with cell reselection or handover.

7. The method of claim 6, wherein the determined behavior associated with the cell reselection or the handover comprises at least one of: disabling cell re-selection to the cell, disabling measurements on the cell, disabling sending a measurement report that is triggered due to the cell, or de-prioritizing measurements for the cell.

8. The method of claim 1, wherein the first characteristic and the second characteristic comprise at least one of: a supported public land mobile network (PLMN), a configured radio access network (RAN) area, or a remote WTRU capability.

9. A relay wireless transmit/receive unit (WTRU), comprising:
   a processor configured to:
   receive information associated with a plurality of remote WTRUs, wherein the information includes a first characteristic associated with a first remote WTRU and a second characteristic associated with a second remote WTRU;
   receive configuration information associated with the relay WTRU;
   determine that the first remote WTRU and the second remote WTRU are supported by a cell, wherein the determination is based on the first characteristic and the second characteristic being supported by the cell;
   determine a behavior of the relay WTRU based at least on the configuration information and the first remote WTRU and the second remote WTRU being supported by the cell, wherein the determined behavior of the relay WTRU is associated with the cell; and
   perform the determined behavior associated with the cell.

10. The relay WTRU of claim 9, wherein the determination of the behavior of the relay WTRU is further based on a percentage of the plurality of remote WTRUs that is supported by the cell.

11. The relay WTRU of claim 10, wherein the determined behavior is further based on the percentage of the plurality of remote WTRUs that is supported by the cell being above or below a threshold.

12. The relay WTRU of claim 10, wherein:
   the cell is a first cell,
   the relay WTRU is connected to the first cell,
   if the percentage of the plurality of remote WTRUs is below a threshold, the determined behavior is a cell reselection to a second cell, and
   if the percentage of the plurality of remote WTRUs is above the threshold, the determined behavior is a measurement of the first cell.

13. The relay WTRU of claim 10, wherein:
   the configuration information indicates a first behavior if the percentage of the plurality of remote WTRUs is above a threshold and a second behavior if the percentage of the plurality of remote WTRUs is below the threshold, and
   the determined behavior is the first behavior or the second behavior.

14. The relay WTRU of claim 9, wherein the determined behavior is associated with cell reselection or handover.

15. The relay WTRU of claim 14, wherein the determined behavior associated with the cell reselection or the handover comprises at least one of: disabling cell re-selection to the cell, disabling measurements on the cell, disabling sending a measurement report that is triggered due to the cell, or de-prioritizing measurements for the cell.

16. The relay WTRU of claim 9, wherein the first characteristic and the second characteristic comprise at least one of: a supported public land mobile network (PLMN), a configured radio access network (RAN) area, or a remote WTRU capability.

\* \* \* \* \*